US009311350B2

(12) United States Patent
Sahr

(10) Patent No.: US 9,311,350 B2
(45) Date of Patent: Apr. 12, 2016

(54) CENTRAL PLACE INDEXING SYSTEMS

(75) Inventor: Kevin Sahr, Applegate, OR (US)

(73) Assignee: State of Oregon Acting By and Through the State Board of Higher Education on Behalf of Southern Oregon University, Ashland, OR (US)

( * ) Notice: Subject to any disclaimer, the term of this patent is extended or adjusted under 35 U.S.C. 154(b) by 611 days.

(21) Appl. No.: 13/504,780

(22) PCT Filed: Oct. 28, 2010

(86) PCT No.: PCT/US2010/054550
§ 371 (c)(1),
(2), (4) Date: Apr. 27, 2012

(87) PCT Pub. No.: WO2011/053728
PCT Pub. Date: May 5, 2011

(65) Prior Publication Data
US 2012/0206494 A1    Aug. 16, 2012

Related U.S. Application Data

(60) Provisional application No. 61/280,070, filed on Oct. 28, 2009.

(51) Int. Cl.
G06T 11/20 (2006.01)
G09G 5/00 (2006.01)
G06F 17/30 (2006.01)

(52) U.S. Cl.
CPC .... *G06F 17/30333* (2013.01); *G06F 17/30241* (2013.01)

(58) Field of Classification Search
CPC ................ G06F 17/30241; G01N 2001/282; B01L 2300/08; G09B 29/003; G01C 21/20
See application file for complete search history.

(56) References Cited

U.S. PATENT DOCUMENTS

| 3,696,566 | A |   | 10/1972 | Langner |
|-----------|---|---|---------|---------|
| 4,456,258 | A | * | 6/1984  | Lodrick ........................ 273/241 |
| 4,691,291 | A |   | 9/1987  | Wolfram |
| 4,809,202 | A |   | 2/1989  | Wolfram |
| 5,761,741 | A |   | 6/1998  | Robbins et al. |
| 5,781,195 | A |   | 7/1998  | Marvin |

(Continued)

FOREIGN PATENT DOCUMENTS

WO    WO 2005/013200        2/2005

OTHER PUBLICATIONS

Affidavit of Joseph L. Ulvr, dated Oct. 6, 2006, Ontario Superior Court of Justice, Court File No. 06-CV-35606.

(Continued)

*Primary Examiner* — Ryan R Yang
(74) *Attorney, Agent, or Firm* — Klarquist Sparkman, LLP

(57) ABSTRACT

Spatial location systems can be based on multi-resolution grids such as mixed aperture combinations of hexagonal cells. A particular finest resolution can be selected based on a suitable combination of intermediate grid apertures such as arbitrary combinations of aperture 3, aperture 4, and aperture 7 hexagons. Location identifiers can be uniquely assigned by generating child cells from a parent cell so that the generated child cells do not overlap child cells of other parent cells. One or more child blocks can be used at any resolution to avoid such overlap. For aperture three and aperture four hexagonal cells, blocks of four and three child cells, respectively, can be used to provide unique location identifiers.

32 Claims, 27 Drawing Sheets

(56) References Cited

U.S. PATENT DOCUMENTS

| | | | |
|---|---|---|---|
| 5,848,404 | A | 12/1998 | Hafner et al. |
| 6,182,069 | B1* | 1/2001 | Niblack et al. |
| 6,292,134 | B1 | 9/2001 | Bondyopadhyay |
| 6,384,826 | B1 | 5/2002 | Bern et al. |
| 7,426,455 | B1 | 9/2008 | Antony |
| 2002/0069018 | A1* | 6/2002 | Brueckner et al. ............ 701/300 |
| 2004/0225665 | A1 | 11/2004 | Toyama et al. |
| 2005/0190179 | A1* | 9/2005 | Hong et al. ................... 345/419 |
| 2005/0193365 | A1 | 9/2005 | Sahr |
| 2006/0265197 | A1 | 11/2006 | Peterson |
| 2010/0295849 | A1* | 11/2010 | Chai et al. .................... 345/420 |
| 2012/0038662 | A1* | 2/2012 | Dicklin et al. ................ 345/593 |
| 2012/0320040 | A1* | 12/2012 | Algreatly ..................... 345/419 |

OTHER PUBLICATIONS

Amended Statement of Defence of the Defendant Perry Peterson, dated Sep. 17, 2008, Ontario Superior Court of Justice, Court File No. 06-CV-35606.

Amendment Under 37 C.F.R. 1.114, filed with the U.S. Patent and Trademark Office on Mar. 25, 2010, in U.S. Appl. No. 10/552,901, 25 pp.

Dutton, "Encoding and Handling Geospatial Data with Hierarchical Triangular Meshes," Department of Geography, University of Zurich, *Advances in GIs Research II, London: Taylor & Francis*, pp. 505-518, (1996).

Exhibit K to Joseph L. Ulvr Affidavit, Oct. 6, 2006.

Exhibit L to Joseph L. Ulvr Affidavit, Oct. 6, 2006.

Gargantini, "An Effective Way to Represent Quadtrees," *CACM*, vol. 25, No. 12, Dec. 1982, pp. 905-910.

Gilmore et al., "Hipparchus Tutorial and Programmer's Guide, Chapter 6: Working with Voronoi Cells," Feb. 27, 2004, 17 pp.

Hou et al., "Hierarchical Path Planning with Hexagonal Decomposition," IEEE Int'l Conf. on Systems, Man and Cybernetics, Oct. 13-16, 1991, vol. 2, pp. 1005-1010.

International Search Report, Dec. 17, 2004, in PCT/CA2004/001507, 2 pp.

Kobbelt, "$\sqrt{3}$-Subdivision," *Computer Sciences*, http:/www-i8.informatik.rwth-aachen.de/publications/downloads/sqrt.3, SIGGRAPH 2000: pp. 103-112 (2001).

Majewski et al., "The Operational Global Icosahedral-Hexagonal Gridpoint Model GME: Description and High-Resolution Tests," *AMS Journals Online*, vol. 130, Issue 2, pp. 319-338.

Middleton et al., "Framework for Practical Hexagonal-Image Processing," *J. Electronic Imaging*, Vo. 11(1), Jan. 2002, pp. 104-114.

Notice of Allowance, dated Mar. 22, 2012, issued by the U.S. Patent and Trademark Office, in U.S. Appl. No. 12/897,612, 11 pp.

Office Action, dated Apr. 9, 2009, issued by the Canadian Intellectual Property Office, in Canadian Patent Application No. 2,436,312, 4 pp.

Office Action, dated Oct. 30, 2008, issued by the U.S. Patent and Trademark Office, in U.S. Appl. No. 10/552,901, 23 pp.

Office Action, dated Oct. 12, 2011, issued by the U.S. Patent and Trademark Office, in U.S. Appl. No. 12/897,612, 11 pp.

Plaintiff's Amended Statement of Claim, dated Aug. 15, 2006, Ontario Superior Court of Justice, Court File No. 06-CV-35606.

Russell, "Spatial Data and the Voronoi Tessellation," *Dr. Dobb's Journal*, Dec. 1, 1992, 30 pp.

Sahr et al., "Discrete Global Grid Systems," *Computing Science and Statistics*, vol. 30 (1998), 10 pp.

Song et al., "Developing an Equal Area Global Grid by Small Circle Subdivision," *Discrete Global Grids*, May 8, 2002, 29 pp.

Supplemental Notice of Allowability, dated Apr. 25, 2012, issued by the U.S. Patent and Trademark Office, in U.S. Appl. No. 12/897,612, 4 pp.

Weisstein, "Koch Snowflake," *Mathworld—A Wolfram Web Resource*, downloaded Aug. 6, 2009, 2 pp.

D. White, "Global Grids from Recursive Diamond Subdivisions of the Surface of an Octahedron or Icosahedron," *Envir. Monitor. and Assess.*, 64(1), 2000, pp. 93-103.

Written Opinion of the International Searching Authority, Dec. 17, 2004, in PCT/CA2004/001507, 4 pp.

Written Opinion of the International Searching Authority, May 17, 2005, in PCT/CA2005/000056, 7 pp.

International Search Report and Written Opinion of the International Searching Authority, mailed Dec. 23, 2010, for corresponding International Application No. PCT/US2010/054550.

Jiang, "Orthogonal and Biorthogonal FIR Hexagonal Filter Banks with Sixfold Symmetry," *IEEE Trans. Signal Proc.*, 56(12):5861-5873 (Dec. 2008).

* cited by examiner

CENTRAL PLACE INDEXING SYSTEMS

CROSS REFERENCE TO RELATED APPLICATIONS

This is the U.S. National Stage of International Application No. PCT/US 2010/054550, filed Oct 28, 2010, which was published in English under PCT Article 21 (2), which in turn claims the benefit of U.S. Provisional Application No. 61/280,070, filed Oct 28, 2009. The provisional application is incorporated by reference herein in its entirety.

FIELD

The present disclosure relates to multi-resolution spatial data structures, and location coding therefor using pure and mixed-aperture polygonal relationships.

BACKGROUND

Spatial data structures typically assign a location representation, or location code, to each data object in a computer program. Structured spatial data structures often use integer location codes which encode location information in such a way that discrete integer operations on these location codes can replace (or act as approximate surrogates for) more computationally expensive operations on traditional floating-point location representations, such as real-number coordinate pairs on the two-dimensional plane, or geographic coordinates on a spheroid. Structured spatial data structures have been used for many common spatial data applications, including indexing spatial databases, representing vector and raster data, and graph data structures.

By far the most widely studied and commonly used structured spatial data structure is the square quadtree. The quadtree can be defined in a number of equivalent ways. A high resolution grid of square cells can be recursively aggregated in groups of 4 squares to form successively coarser resolution cells. Conversely, a coarse resolution base cell can be recursively subdivided into 4 smaller child squares. A hierarchical quadtree indexing can be formed by assigning a base address to each coarse base cell, and forming the address of child (and descendent) cells by concatenating one of the additional digits 1-4 to the parent cell index, where the digits are chosen in a geometrically consistent fashion. The resulting indices can be arithmetically and algebraically manipulated to provide efficient versions of important operations such as vector addition and metric distance.

Structured spatial data structures based on hexagonal cells can be superior to square grids under many comparison metrics. For example, planar hexagonal grids are the most efficient location quantizer, have the best angular resolution, and the cells display uniform neighbor adjacency. Further, a discrete metric distance on a hexagonal grid is a better approximation to distance on the real number plane, enabling more efficient coarse filtering of spatial proximity queries. But unlike the square quadtree which can be defined equivalently via aggregation or recursive partition, multiple resolutions of hexagonal cells cannot be created by simple aggregation of atomic pixels, nor by recursive partition.

Additional background information relating to modified generalized balanced ternary (MGBT), aperture three hexagon trees (A3HT), and hierarchical location coding methods for geospatial computing on icosahedral aperture 3 hexagon discrete global grid systems (DGGS), can be found in U.S. patent application Ser. No. 11/038,484, filed Jan. 21, 2005, and U.S. patent application Ser. No. 12/897,612, filed Oct. 4, 2010, both of which are incorporated by reference herein in their entireties.

SUMMARY

Disclosed herein are several examples of multi-resolution indexing. Generally, multi-resolution coordinates can be assigned in arbitrary combinations depending on application requirements, such as resolutions of various indexing levels. In some examples, grids based on aperture 3, aperture 4, and aperture 7 can be provided in any order such as 3-4-7, 7-4-3, 4-3-7 and produce a common grid at a finest resolution. In addition, a finer resolution grid can be produced without providing one or more lower resolution grids. Coordinate values can be assigned in a layer of any aperture based on a user preferred coordinate assignment. Examples described herein show representative arrangements of uniquely assigned aperture 3, 4 and 7 children. Any method that assigns to a parent its center child cell and some subset of the vertex/edge child cells can be used, and the illustrated examples (that tend to be more symmetrical than many other examples) are selected for convenient explanation.

In exemplary methods, mixed-aperture polygons are established by specifying a first polygon having a first center point and specifying a second polygon having the first center point, the second polygon being a first aperture child of the first polygon. A third polygon is specified having the first center point, the third polygon being a second aperture child of the second polygon, wherein the first and second apertures are selected from a group consisting of aperture 3, aperture 4 and aperture 7, and the first aperture is different than the second aperture. In some examples, a location identifier is assigned that is associated with an object located within an area defined by the third polygon, the location identifier being based on the first, second and third polygons and the first and second apertures. In some examples, the location identifier associated with the third polygon is stored in integer code form, modified integer code form, or packed code form. In further examples, the first, second and third polygons are centered on a vertex of a triangulated two-dimensional manifold and the first polygon is a voronoi area of the vertex relative to other vertexes of the manifold. In some examples, the manifold is a triangle faced regular polyhedral or an arbitrary two-dimensional triangulated manifold with unequal edges. In some examples, the first, second and third polygons are hexagons, and at least one of the second and third polygons is rotated 30° or about 19° with respect to its parent polygon. In additional examples, the third polygon has the same size, rotation and position relative to the first polygon if the first and second apertures are reversed.

Additional methods comprise specifying a first cell size and specifying a second cell size that is larger than the first cell size. One or more intermediate cell sizes are specified, each being larger than the first cell size and smaller than the second cell size. Each of the first cell size and the intermediate cell sizes comprises a respective size ratio relative to a next largest cell size, the next largest cell size being one of the intermediate cell sizes or the second cell size; the size ratios not being all the same. A cell grid is assigned to an area, wherein the cell grid includes at least one cell of the first cell size, the intermediate cell sizes, and the second cell size. In some examples, the size ratios are area ratios chosen from a group comprising 1:3, 1:4 and 1:7. In other examples, ratio can be based on a linear cell dimension. For example, for regular polygons, alternative linear dimension ratios can be selected from the group consisting of $\sqrt{7}$, $\sqrt{4}$, $\sqrt{3}$. In other examples, the first, second and intermediate cell sizes correspond to an area of a hexagon. In further examples, the first cell size corresponds to a desired minimum resolution of a multi-resolution central place indexing system and the second cell size corresponds to a maximum resolution of the multi-resolution central place indexing system.

Apparatus comprise at least one computer readable medium and a processor. The processor is configured to establish an object location with reference to a multi-aperture grid based on computer-executable instructions stored in the at least one computer readable medium. In some examples, the processor is further configured to assign a unique location code to the object. In other embodiments, the processor is further configured to establish at least a portion of the multi-aperture grid by generating non-overlapping cells, and provide a unique location code based on at least one non-overlapping cell. In other representative examples, the processor is configured to establish at least a portion of the multi-resolution grid based on aperture 3 child cells, and to associate three child cells with aperture three base cells so as to provide a unique location code for the object location. In still further examples, the processor is configured to establish the multi-resolution grid with respect to a spherical surface.

The foregoing and other features will become more apparent from the following detailed description, which proceeds with reference to the accompanying figures.

DETAILED DESCRIPTION

Figure 1:
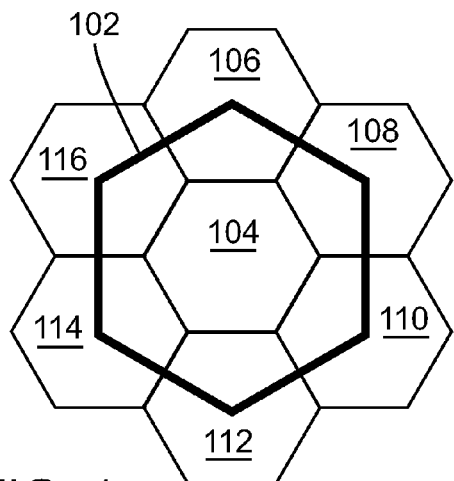
FIG. 1 shows a hexagonal grid associated with aperture 3 child hexagons.

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

This disclosure relates to multi-resolution polygon systems including defining, indexing and storing the systems, and focuses on systems called Central Place Indexing or CPI systems. CPI systems can provide uniform hierarchical structured spatial location coding for multi-resolution pure and mixed aperture 3, 4, and/or 7 polygonal (usually hexagonal) systems, including in relation to triangulated manifolds. Such methods are generally implemented on one or more computer-based processing systems as described in further detail below.

The disclosed grids can be conveniently arranged so as to completely cover a surface. Such coverages can be referred as tessellations. However, in many practical examples, only selected portions of a surface are covered, and gaps between grid elements can be tolerated. Such arrangements can be referred to as incomplete tessellations.

Sequences of grids that include arrays of finer and coarser grids can be described based on one or more elements that are repeated to form the grid (for example, hexagons, pentagons, or combinations thereof) and areas of the next finer grid elements. For example, for grids formed of hexagons, finer grids can be defined from a grid of initial or "parent" hexagons based on "child" hexagons having areas of ⅓, ¼, and ⅐ of the area of a parent hexagon. Some such finer grids are referred to as aperture 3 (A3), aperture 4 (A4), and aperture 7 (A7), respectively, based on area scaling. In other examples, some finer grids are based on scaling of linear dimension ratios by factors such as √7, √4, √3 corresponding to apertures A7, A4, A3, respectively. In the disclosed examples, grids are described with respect to regular or irregular polygons such as hexagons, pentagons, triangles or other regular or irregular shapes. For convenience, such grid elements are also referred to as cells, and if generated based on a larger or smaller cell, can be referred to as a "child" cell or a "parent" cell, respectively.

CPI Topology and Generation

FIG. 1 shows a parent hexagon 102 and seven aperture 3 (A3) children, including a center child 104 that is centered at the center of the parent hexagon 102, and six vertex children 106-116 that are centered on the six vertices of the parent hexagon 102. Each child hexagon has ⅓ the area of the parent hexagon 102 and is rotated 30° relative to the parent. Note that whether the child hexagons 106-116 are rotated 30° clockwise or counter-clockwise relative to the parent, the resulting arrangement of A3 child hexagons is the same. Thus, for A3 hexagons, a direction of rotation of child hexagons with respect to a parent hexagon can generally be omitted.

Figure 2:
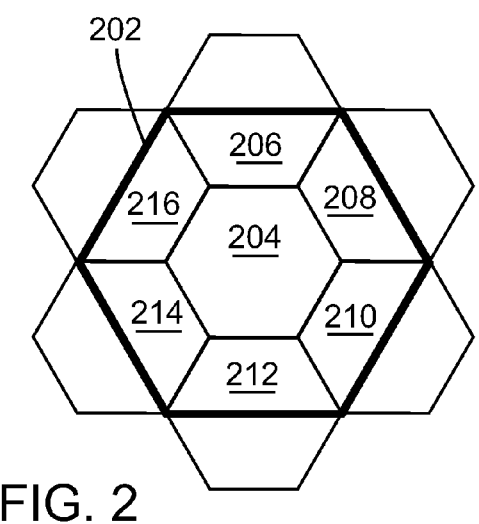
FIG. 2 shows a hexagonal grid associated with aperture 4 child hexagons.

FIG. 2 shows a parent hexagon 202 and seven aperture 4 (A4) child hexagons including a center child hexagon 204 that is situated at the center of the parent hexagon 202, and six edge child hexagons 206-216 that are centered on mid-points of the six edges of the parent hexagon 202. Each child hexagon has ¼ the area of the parent hexagon 202 and is not rotated relative to the parent hexagon 202.

Figure 3:
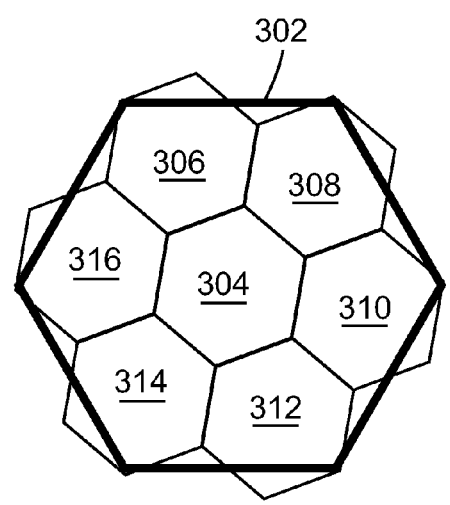
FIGS. 3 and 4 show hexagonal grids associated with aperture 7 child hexagons in two rotations.
Figure 4:
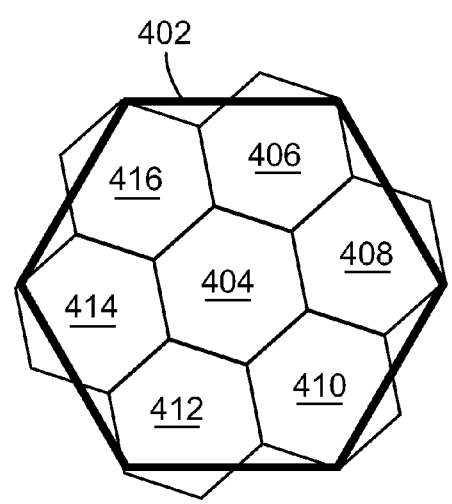

FIG. 3 shows a parent hexagon 302 and seven aperture 7 (A7) children, including a center child 304 that is centered at the center of the parent, and six children 306-316 that each share a vertex with the parent hexagon 302. Each child hexagon has ⅐ the area of the parent hexagon 302, and thus the seven child hexagons have the same total area as the parent hexagon 302. FIG. 4 also shows a parent hexagon 402 and seven A7 children 404-416, but the child hexagons 404-416 have different rotations with respect to the parent hexagon 302 that that of the child hexagons of FIG. 3. FIGS. 3 and 4 represent counter-clockwise and clockwise A7 child rotations, respectively.

Note that in each case described above, seven hexagonal children can be assigned or tessellated, into a block without open spaces between the children and the block has an area at least as great as the area of the parent. Each block also includes a child hexagon that is concentric with its parent hexagon. In each case, one or more hexagons can be further tessellated to form a grid of hexagons without open spaces between hexagons. Furthermore, these A3, A4 and A7 parent-child relationships can be recursively applied to create finer decedent hexagons. For convenience in the following description, each different size of hexagon in a grid is referred to herein as a resolution. If each different resolution in a multi-resolution grid has the same aperture relationship to the next finer resolution, then the grid can be referred to as pure grid. If a grid includes more than one aperture relationship, then the grid can be referred to as a mixed-aperture grid.

Figure 5:
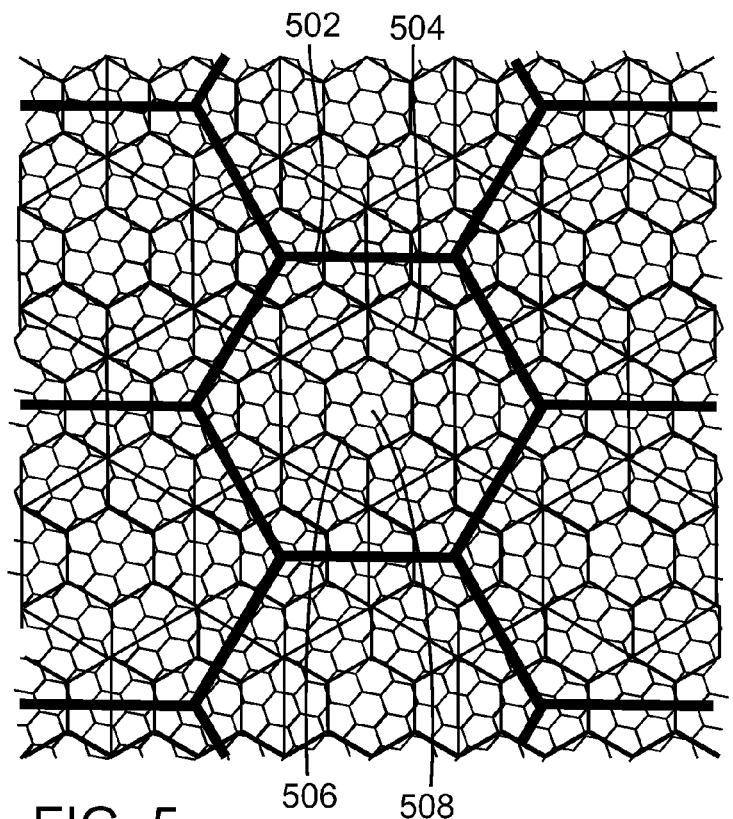
FIGS. 5-8 show exemplary mixed-aperture relationships.

FIG. 5 shows an area to which a mixed-aperture multi-resolution hexagon grid is assigned. The grid comprises a set of first resolution ($r_1$) parent hexagons 502, a set of second resolution ($r_2$) hexagons 504 that are A3 children of the $r_1$ hexagons 502, a set of third resolution ($r_3$) hexagons 506 that are A4 children of the $r_2$ hexagons 504, and a set of fourth resolution ($r_4$) hexagons 508 that are A7 children of the $r_3$ hexagons 506 with a clockwise rotation. Note that the specific hexagons labeled 502, 504, 506 and 508 are concentric with respect to their respective parent hexagons, and other hexagons are not labeled.

Figure 6:
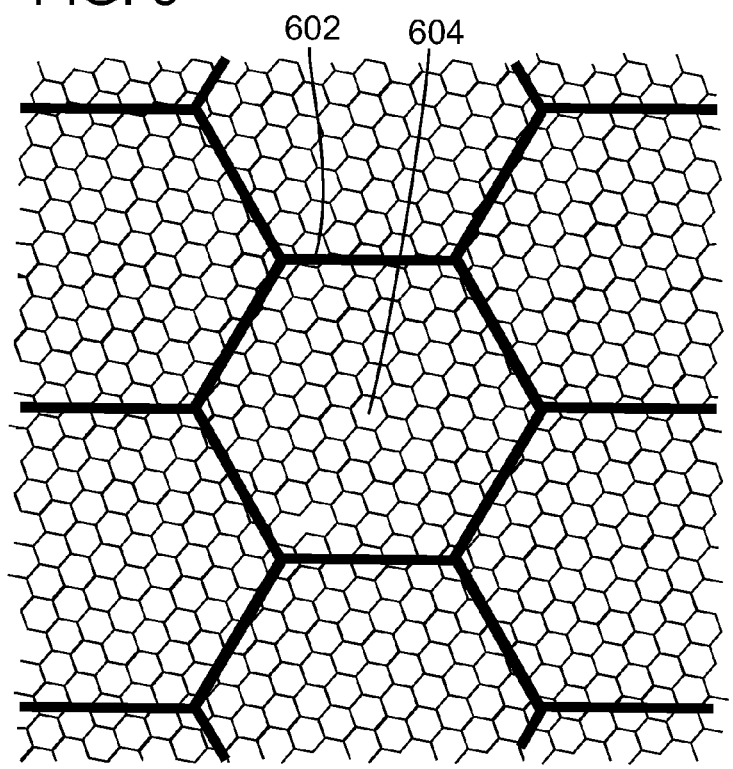

FIG. 6 shows an area to which a grid similar to that of FIG. 5 is assigned, but without intermediate resolution $r_2$ and $r_3$ hexagons. Only $r_1$ hexagons 602 and A3-A4-A7 great-grandchild hexagons 604 are shown. Because the product of 3*4*7 is 84, the $r_4$ hexagons 604 each have an area that is 1/84 of the area of each of the $r_1$ hexagons 602.

Figure 7:
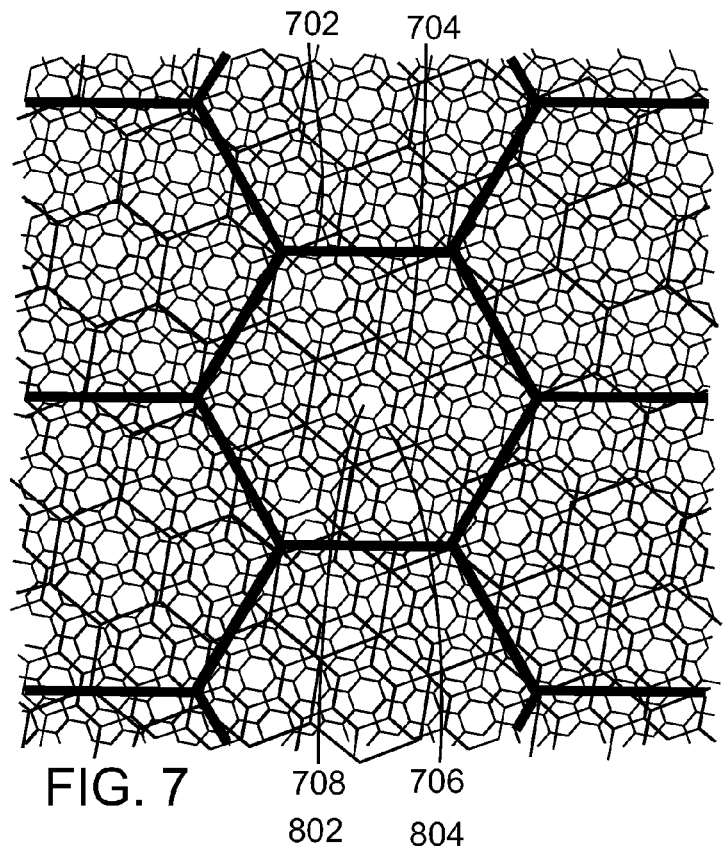

FIG. 7 shows a portion of another representative mixed-aperture multi-resolution hexagonal grid. The grid comprises a set of $r_1$ parent hexagons 702, a set of $r_2$ hexagons 704 that are A7 children of the $r_1$ hexagons 702 with a clockwise rotation, a set of $r_3$ hexagons 706 that are A4 children of the $r_2$ hexagons 704, and a set of $r_4$ hexagons 708 that are A3 children of the $r_3$ hexagons 706. Note again that the specific hexagons labeled 702, 704, 706 and 708 are concentric and other hexagons are not labeled.

Figure 8:
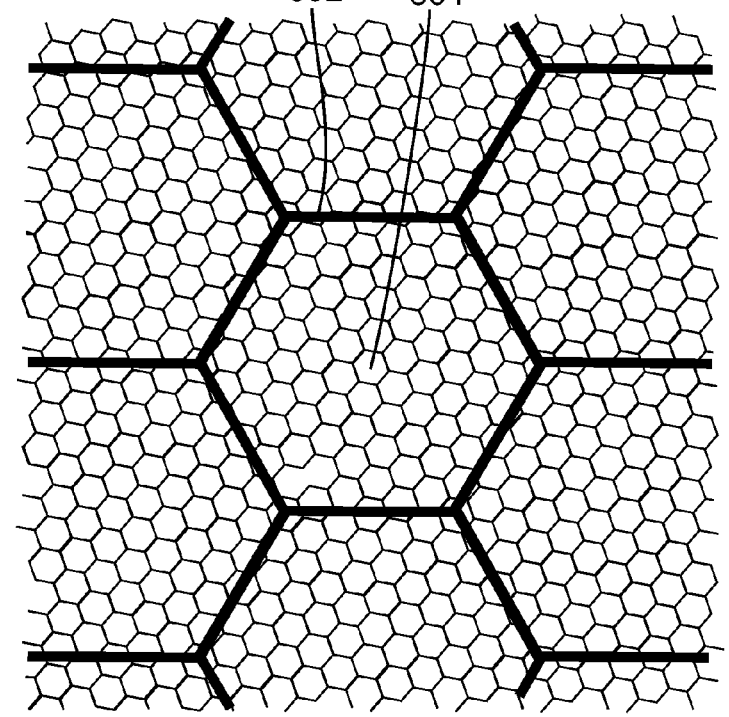

FIG. 8 shows a grid similar to that of FIG. 7 but without $r_2$ and $r_3$ hexagons. Only $r_1$ hexagons 802 and their A7-A4-A3 great-grandchild hexagons 804 are shown. The product of 7*4*3 is 84, and the $r_4$ hexagons 804 each have an area that is 1/84 of the area of each of the $r_1$ hexagons 802. The $r_4$ grid hexagons 708, 804 of FIGS. 7-8 correspond to the $r_4$ grid hexagons 508, 604 of FIGS. 5-6, even though the intermediate resolution $r_2$ and $r_3$ hexagons have different sizes and rotations. Thus, the resolution $r_4$ grid can be determined by simply multiplying the intermediate apertures. Furthermore, grid formation follows a commutative property wherein a final arrangement of grids does not depend on the order in which various apertures are assigned to an area, but depends only on the total product of the apertures.

For example, referring to FIG. 8, the hexagons 804 can be considered $r_2$, A84 children of the $r_1$ hexagons 802, and intermediate resolution hexagons can be eliminated. In general, given a sequence of intermediate apertures and rotations that generate a higher resolution grid from a base resolution grid, that higher resolution grid can be generated directly (without generating intermediate resolution grids) by starting with the base resolution grid, scaling the base grid cell area by the inverse of the product of the intermediate apertures and rotating it by the summation of the intermediate rotations. The geometry of the resulting grid is independent of the order in which the intermediate apertures are applied to the base grid; any sequence consisting of the same number of each aperture/rotation choice can be used to generate the same resulting grid.

Figure 9:
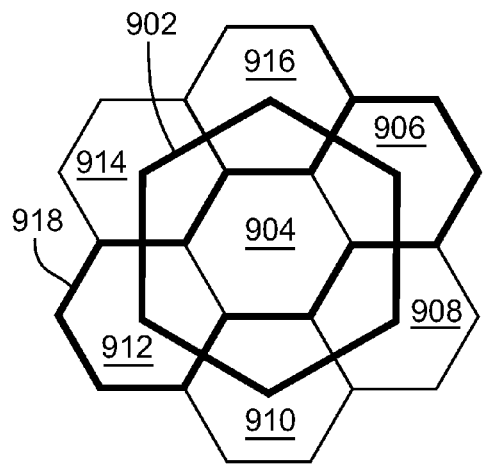
FIGS. 9-15 show exemplary CPI tiling blocks and tessellation patterns.

As shown in FIG. 1, seven A3 children of parent hexagon 102 cover an area greater than the area of the parent hexagon. Thus, if adjacent hexagons in a grid having the resolution of the parent hexagons 102 each generate a block of seven child hexagons, then there could be considerable hexagon overlap. For example, each of the child hexagons centered on a vertex of a parent hexagon would overlap child hexagons of other parent hexagons. Such overlap can make unique indexing difficult. To avoid overlap, subsequent resolutions can be configured so that each parent hexagon generates three A3 child hexagons. For example, as shown in FIG. 9 parent hexagon 902 is used to generate three A3 children: a concentric child 904 and two vertex children 906, 912. Additional A3 child hexagons 908, 910, 914, 916 are centered on a vertex of the parent 902, but are A3 children associated with neighboring parent hexagons, and not the parent hexagon 902. For convenient illustration the A3 child hexagons 904, 906, 912 are show as a block 918 in FIG. 9.

Figure 10:
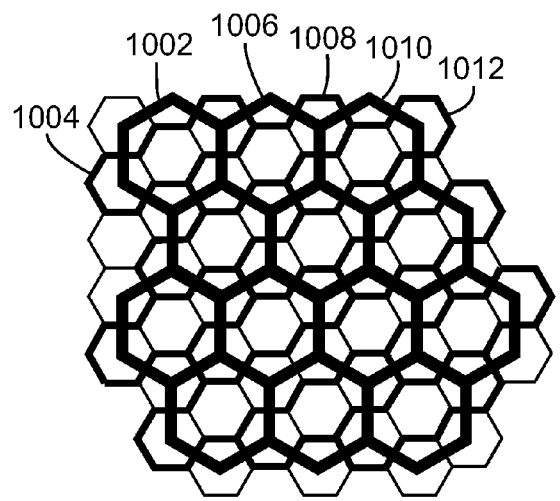

FIG. 10 shows an area to which parent hexagons 1002, 1006, 1010 generate three-child blocks 1004, 1008 and 1012, respectively. The child blocks 1004, 1008, 1012 fit together geometrically so as to completely cover an area without gaps. In addition, each child hexagon is uniquely associated with only one parent, and does not overlap with other child hexagons.

Although not shown in FIG. 9, the three-child block 918 could alternatively comprise other groups of child hexagons, such as hexagons 904, 906 and 908, or hexagons 904, 906 and 910, to form other tessellatable patterns. Any three-child block desirably includes the center child 904, but does not need to.

Figure 11:
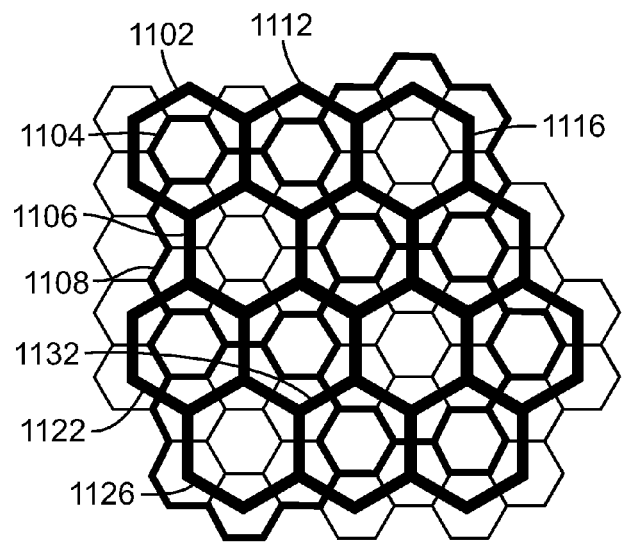

FIG. 11 shows a partial tessellation that includes parent hexagons such as parent hexagon 1102 that is associated with a single, concentric A3 child hexagon 1104. Other parent hexagons such as parent hexagon 1106 are associated with seven A3 children shown as block 1108. Hexagons such as those of the seven child block 1108 and the only child hexagon 1104 can be situated to form a full grid without spaces between the child hexagons. In FIG. 11, additional parent hexagons associated with seven child hexagon blocks include parent hexagons 1116, 1126 and additional parent hexagons that are associated with a single child hexagon include parent hexagons 1112, 1122, 1132. In the arrangement of FIG. 11, each child block, whether an only-child or a full block, is preferably concentric with its parent hexagon. There are also many other similar patterns not shown where different parents are associated with differently shaped child-blocks, and patterns can be based on apertures other than A3.

Figure 12:
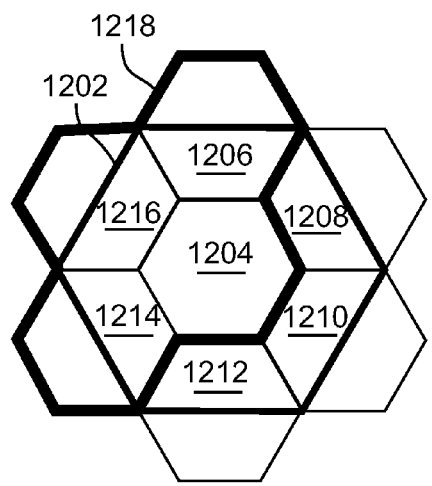
Figure 13:
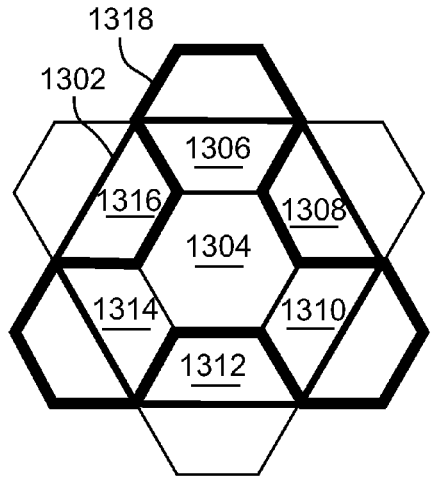

Partial tessellations can also be based on A4 and A7 apertures as shown in FIGS. 12-13. As shown in FIG. 12, a parent hexagon 1202 generates four A4 child hexagons: a concentric child 1204 and three edge children 1206, 1214, 1216. Hexagons 1208, 1210 and 1212 are centered on an edge mid-point of the parent 1202, but are A4 children generated by other neighboring parent hexagons that are not shown in FIG. 12. The block of A4 children of parent 1202 is bolded and labeled 1218. FIG. 13 shows a partial tessellation in which a parent hexagon 1302 generates four A4 children: a concentric child 1304 and three edge child hexagons 1306, 1310, 1314. Hexagons 1308, 1312, 1316 are centered on an edge mid-point of the parent 1302, but are A4 child hexagons generated by other neighboring parent hexagons. A block 1318 includes the A4 child hexagons 1304, 1306, 1310, 1314 of the parent hexagon 1302. The block 1318 can be preferred to the block 1218 of FIG. 12 as the block 1318 is more geometrically centered with respect to its parent hexagon.

Figure 14:
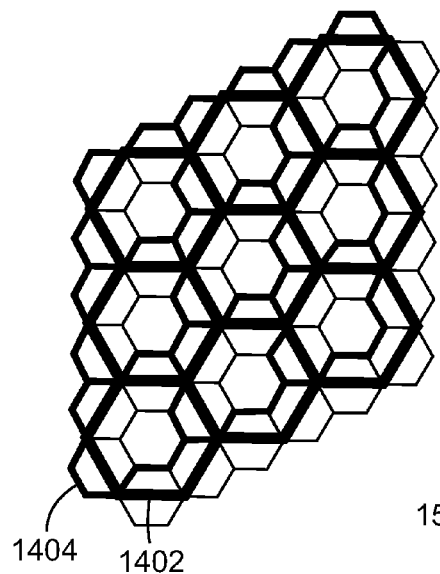
Figure 15:
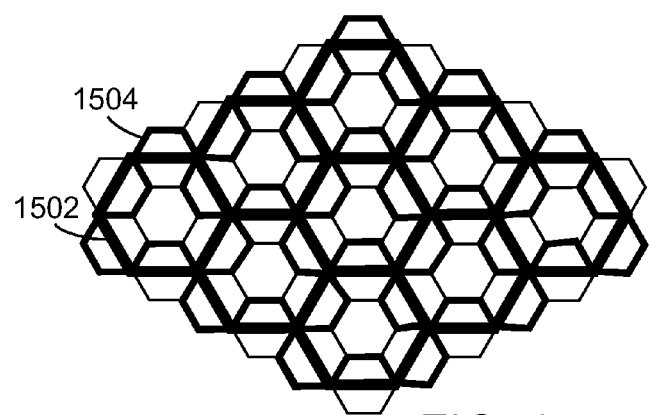

With reference to FIG. 14, a partial tessellation includes parents 1402 and four-child blocks 1404 similar to the blocks 1216 of FIG. 12. The child blocks 1404 can be fit together geometrically without spaces, and each child hexagon is uniquely associated with only one parent, and does not overlap with other child hexagons. FIG. 15 shows a partial tessellation of parents 1502 and four-child blocks 1504 that are similar to the block 1318 of FIG. 13.

For both A3 and A4, two or more child block patterns can fit together geometrically so as to completely cover an area without gaps. FIG. 11 represents one example for A3. While the example in FIG. 11 comprises two block types having differing numbers of child cells, other exemplary tiling patterns can comprise two or more different block types having the same number of child cells. For example, the A4 child blocks shown in FIGS. 12 and 13 could be mixed together so as to completely cover an area without gaps. Many other mixed child block patterns can also be defined for any given resolution in a grid system. Different resolutions of the same aperture can also comprise different child block patterns. For example, one A4 resolution can comprise a combination of the child block patterns shown in FIGS. 12 and 13, while another A4 resolution in the same grid system can comprise a combination of the block patterns shown in FIG. 20B(III) and FIG. 20B(IV). Thus, any system of grouping child cells into blocks such that every child cell is associated with one of the parent cells can be used.

It should be appreciated that, in each of the examples shown above, the generation of child blocks can be iterated recursively to produce finer and finer resolutions until a desired resolution is achieved. In addition, at each resolution, a different aperture, different rotation, and/or a different child block pattern can be applied. It should also be appreciated that similar child-generation patterns can be accomplished with other polygons, such as triangles, squares and pentagons, and combinations of different polygons. In addition, the polygons can be irregular, having edges of unequal lengths.

Rather than starting with a coarsest base cell or a grid of base cells and generating successively finer resolutions of child cells, groups of finer resolution cells can be aggregated into coarser cells using the same concepts as discussed above, but in reverse. For example, the seven smaller hexagons 304-316 in FIG. 3 could be defined first, and then aggregated to generate the larger hexagon 302. Furthermore, intermediate resolution cells can be first defined, and then both coarser and finer resolutions of cells can be generated from the intermediate resolution cells. For example, in FIG. 5, the hexagons 504 can be defined first, and then the hexagons 504 can be aggregated to generate the coarser resolution hexagons 502 and can also generate the finer resolution hexagons 506.

Alternatively, two or more independent resolutions of cells can be first defined, such as a coarsest resolution and a finest resolution. Combinations of intermediate resolutions of different apertures can then be calculated to best represent a generational series that allows one of the independent resolutions to be generated from one another. For example, in FIG. 5, the coarsest resolution hexagons 502 and the finest resolution hexagons 508 can be defined first. Then, because the hexagons 508 are 1/84 of the area of the hexagons 502, intermediate resolutions can be calculated such that the product of their apertures equals 84. As noted above, the product of 3*4*7 is 84, so any order of these apertures would allow the hexagons 508 to be generated from the hexagons 502. In some situations, there may not be a perfect combination of apertures that unites two independent resolutions, in which case a different independent resolution can be selected for at least one of the two independent resolutions.

CPI Indexing and Coding

In addition to defining a multi-resolution pure or mixed aperture grid as described above, each of the cells in such a grid can also be indexed (i.e., assigned an address) that can be stored. A representative indexing method is described below.

Starting with a coarsest resolution of cells (referred to in this example as resolution 0 cells or base cells), each base cell is assigned a unique address, such as an integer 1, 2, 3, 4, etc. For example, in FIG. 1, the coarsest hexagons such as the hexagon 102 can be base cells and each of the base cells can be assigned a unique integer address (1), (2), (3), etc. These base cell addresses can be arranged in any convenient pattern. For example, in FIG. 1, hexagon 102 can be addressed as (1) and the six neighboring hexagons of the same size (not shown) can be addressed as (2) through (7). Next, for each base cell, an index consisting of the index of the address of the parent base cell with one of the digits 0-6 appended is assigned to its concentric child cell and to each of its other six child cells (i.e., resolution 1 cells). For example, in FIG. 1, for base hexagon 102, which was given an address of (1), the concentric child hexagon 104 is assigned an index of (1,0) the six vertex child hexagons 106-116 are assigned indices (1,1) through (1,6). Likewise, for a base hexagon adjacent to the hexagon 102 assigned an address of (4), the seven child hexagons are assigned addresses (4,0) through (4,6).

Similarly, for each resolution 1 cell, an index consisting of the index of the address of the parent base cell with one of the digits 0-6 appended is assign to its concentric child cell and to each of its other six child cells (i.e., resolution 2 cells). For example, in FIG. 1, for the resolution 1 hexagon 104, which was given an address of (1,0), its concentric child cell is assigned an index of (1,0,0) its six vertex child cells are assigned indexes of (1,0,1) through (1,0,6). Likewise, for the resolution 1 hexagon 116 which is assigned an address (1,6), its seven children are assigned addresses (1,6,0) through (1,6, 6). In general, given a resolution k cell P, the resolution k+1 cell P' centered on P and each of the resolution k+1 neighbors of P' can be assigned an index consisting of the index of P with one of the digits 0-6 appended.

Because some of the k+1 resolution cells in aperture 3 or 4 grid resolutions overlap multiple resolution k cells, the above method will assign multiple indices to some of the resolution k+1 cells. If a unique index is desired for a resolution k+1 cell P', any one of the indexes generated can be chosen as the cell index and other indices disregarded. Typically, a resolution k cell having an index P generates a resolution k+1 cell that is centered on it or shares the same center point, and this k+1 resolution cell can be associated with an index based on the index P of the parent cell. The resolution k+1 cells situated on vertices or edges of resolution k cells can be assigned to resolution k indexing parents by various methods.

For A3 grids, FIG. 9 shows one possible assignment of three resolution k+1 child cells 904, 906, 912 to a resolution k indexing parent (note that similar tiling blocks to the block 918 can be formed by 60° rotations of the tiling block 918). In this example, if the cell 902 is assigned an address (9), then the cell 904 can be assigned an address of (9,0), the cell 906 can be assigned the address (9,1) and the cell 912 can be assigned the address (9,2). The cell 908 is indexed with reference to a parent cell to the right of the cell 902, the cell 914 is indexed with respect to a parent cell to the left of the cell 902, etc., as is shown in FIG. 10.

FIG. 11 demonstrates another possible assignment of three A3, resolution k+1 child cells to resolution k indexing parents using two different assignment patterns. One assignment assigns seven resolution k+1 child cells (e.g., the cells of the child block 1108) to some resolution k parents (e.g., cell 1106), and the other assigns a single resolution k+1 cell (e.g., single child 1104) to some resolution k parents (e.g., the cell 1102).

For A4 grids, FIG. 12 shows one possible assignment of four resolution k+1 child cells to a resolution k indexing parent (note that similar tiling blocks can be formed by 60° rotations of this tiling block). In this example, if cell 1202 is assigned an address as (12), then the cell 1204 can be assigned an address (12,0), the cell 1206 can be assigned the address (12,1), the cell 1214 can be assigned the address (12,2) and the cell 1216 can be assigned the address (12,3). The cell 1208 is indexed by a parent cell to the upper-right of the parent cell 1202, the cell 1210 is indexed by a parent cell to the lower-right of the cell 1202, etc., as is shown in FIG. 14. Alternative A4 index assignments can be based on A4 child blocks as illustrated in FIGS. 13 and 15.

For A7 grids, the seven children have the same total area as the parent and the seven children of each parent do not overlap with the children of any other adjacent parents. Thus, there is no need to define special child blocks consisting of less than all seven children in order to provide unique addresses. Each parent can index seven children as 0-6. For example, in FIG. 3, if the parent cell 302 is addressed as (3), then the concentric child cell 304 can be assigned the index (3,0) and each of the other child cells can be assigned indices (3,1) through (3,6).

A resolution k+1 digit value of 7 can be used to indicate address termination, such as in a variable length index scheme, or can be used to indicate that all finer resolution cells are centered on their geometrical parent cells, such as in a fixed length index scheme. For example, in FIG. 1, an address of (1,6,7) for the cell 116 can indicate that the digit 6 is the end of the address. Alternatively, the digit 7 can indicate that the cell 116 is of the finest resolution and/or has no children.

Once the CPI cell geometry is defined and the CPI indexes (also referred to as location codes or addresses) are assigned to the cells, the CPI indexes can be stored using any suitable coding form. Some examples include the following: a character string code form; an integer code form; a modified integer code form; and a packed code form. Coding is more fully discussed in U.S. patent application Ser. No. 11/038,484 and U.S. patent application Ser. No. 12/897,612 that are both incorporated herein by reference. The combination of a grid topology and an indexing scheme can define a CPI system.

CPI Systems on Ideal CPI Manifolds

The topology and location coding of CPI systems on ideal CPI manifolds are discussed next. An ideal CPI manifold is a triangulated 2-dimensional (2D) manifold, with equal length edges connecting adjacent vertices to create planar triangle faces, and where each of the vertices has a valence of at most 6. Some ideal CPI manifolds include a regular triangular lattice on the plane (see lattice 1600 in FIG. 16) and triangle-faced regular polyhedra such as the icosahedron, (see FIGS. 22B and 23F). By contrast, an arbitrary triangulated two-dimensional manifold can comprise irregularly shaped triangles and unequal lengths between adjacent vertices, such as triangulated irregular networks or stellated polyhedra.

A CPI system, defined in relation to an ideal CPI manifold, can be applied to arbitrary triangulated two-dimensional manifolds by defining an appropriate mapping between these manifolds and a topologically equivalent ideal CPI manifold. For example, a CPI hierarchy, or multi-resolution cell geometry, can be constructed on an arbitrary two-dimensional triangulated manifold by defining a mapping (e.g., bilinear interpolation) between one (or more) of the irregular triangles adjacent to each vertex and the corresponding equilateral triangle on a topologically equivalent ideal CPI manifold.

Similarly, CPI systems can be defined in relation to triangulations of a curved, or non-planar, 2D surface by defining a mapping between the curved triangles and an ideal CPI manifold. One example of this is the use of CPI systems to define and index pure and mixed aperture hexagonal discrete global grid systems (DGGS). In one example, a CPI system can be implemented using the projection of the Earth's surface, such as the Fuller projection, to map planar triangles of an icosahedron (an ideal CPI manifold) to the spherical triangles of a spheroid or ellipsoid representation of the Earth's surface (see FIGS. 22A-22F, for example).

More specific definitions of a CPI system with respect to an ideal CPI manifold can be established. In one example, a cell in resolution k of a CPI system defined in relation to an ideal CPI manifold M includes the following:

1. a point on M that is either a vertex of M (if k=0) or introduced through generation of subsequent resolutions of the CPI system (if k>0).

2. the polygonal voronoi area on M associated with that point; where the voronoi is defined relative to all other resolution k cell points.

3. a generator that specifies the geometry, generator types, and location coding of all resolution k+1 cells that are children of this cell in the hierarchy defined by the CPI system.

Figure 16A:
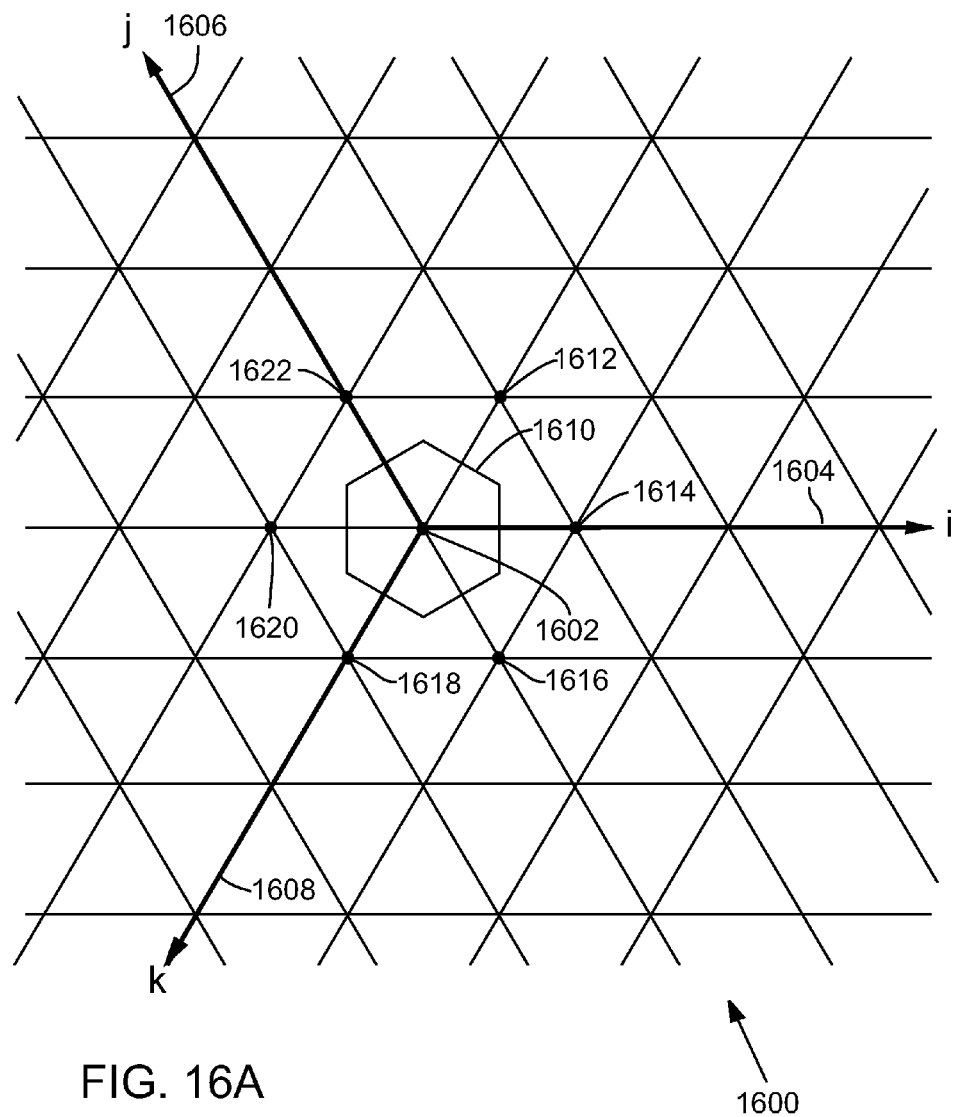
FIG. 16A shows a triangulated manifold and a related voronoi area.

With reference to FIG. 16A, a cell 1610 is defined as described above. A lattice 1600 corresponds to an ideal CPI manifold M, wherein axes 1604, 1606 and 1608 are evenly spaced 120° apart and the plane is tiled with equilateral triangles. The point of M can be an origin 1602 which is a vertex on M. The cell 1610 can be a base tile of a CPI system in a resolution 0. Notice that the cell 1610 defines a voronoi area on M, wherein every point within the cell 1610 is closer to vertex 1602 than to any other vertex on M and each edge of the cell 1610 is equidistant from the vertex 1602 to one of the adjacent vertices 1612, 1614, 1616, 1618, 1620 and 1622.

A CPI system specification can then be defined to include the following:

1. a connected set of resolution 0 cells referred to as the system base tiles.

2. a sequence of apertures 3, 4, and/or 7 that define the topology of each finer resolution in the system. For apertures 3 and 7, a direction of rotation is also specified.

The cells at all resolutions of the CPI system can then be geometrically defined and indexed by recursive application of the generator rules at each resolution.

Useful Coordinate Systems

Figure 17:
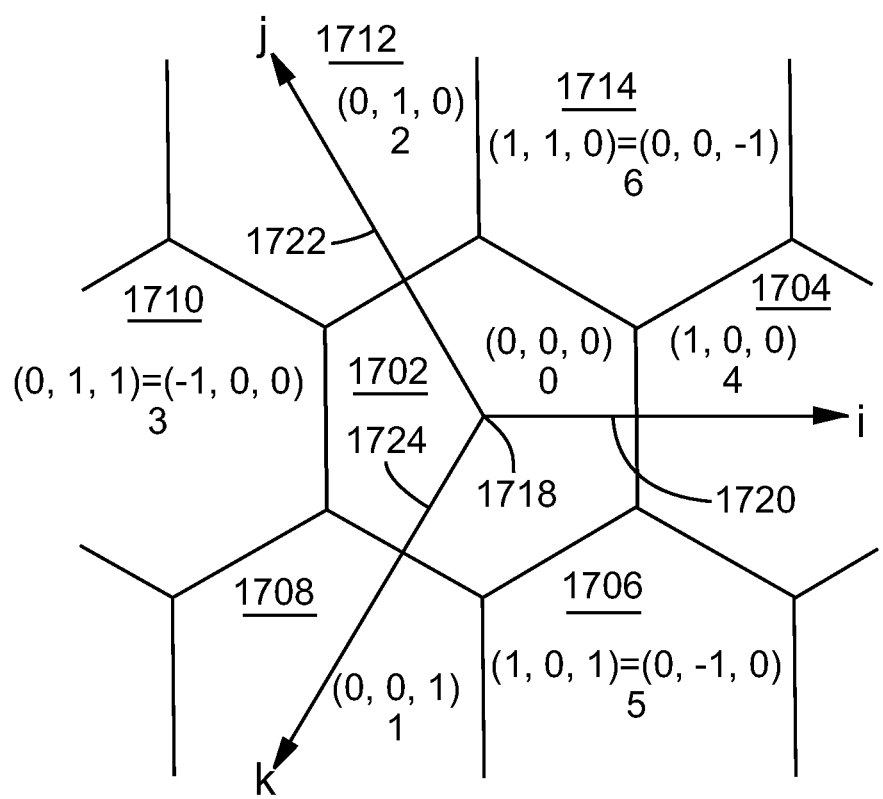
FIG. 17 shows an exemplary ijk+ coordinate system for a hexagon grid.

As used herein, a discrete coordinate system, with three natural axes of a hexagonal topology, and with a vertex of M as its origin can be referred to as an ijk coordinate system. The axes 1604, 1606, 1608 and the origin 1602 of FIG. 16A are a representative example. FIG. 17 shows another example of an ijk coordinate system comprising an origin 1718, i-axis 1720, j-axis 1722 and k-axis 1724. Note that in both of these examples, one of these axes is redundant, so there are multiple equivalent coordinate triplets for each hexagon. For example, in FIG. 17, hexagon 1706 be assigned coordinate triplets (1,0,1) or (0, −1,0), hexagon 1710 can be assigned triplets (0,1,1) or (−1,0,0) and hexagon 1714 can be assigned triplets (1,1,0) or (0,0, −1). Even hexagon 1702 can be assigned triplets other than (0,0,0), such as (1,1,1).

FIG. 17 also illustrates a so-called ijk+ coordinate system, wherein coordinates are assigned to each cell so that no negative values are allowed and the coordinates assigned to each hexagon are minimal positive components. Such coordinate assignments produce coordinate triplets that have at most two non-zero components. For example, hexagon 1702 has the ijk+ coordinates (0,0,0), hexagon 1704 has coordinates (1,0, 0), hexagon 1708 has coordinates (0,0,1) and hexagon 1712 has coordinates (0,1,0).

The ijk+ coordinates (i+, j+, k+) of an arbitrary ijk coordinate triplet (i, j, k) can be determined based on the following computer-executable instructions:

```
ALGORITHM ijkToIjk+ TAKES ijk VECTOR V = (i, j, k)
    RETURNS ijk+ VECTOR V+ = (i+, j+, k+)
    V+ := V
    IF i LESS THAN 0 THEN
        j+ := j+ − i
        k+ := k+ − i
        i+ := 0
    END IF
    IF j LESS THAN 0 THEN
        i+ := i+ − j
        k+ := k+ − j
        j+ := 0
    END IF
    IF k LESS THAN 0 THEN
        i+ := i+ − k
        j+ := j+ − k
        k+ := 0
    END IF
    IF number of zero components in V+ LESS THAN 1 THEN
        min := MINIMUM OF i+, j+, k+
        i+ := i+ − min
        j+ := j+ − min
        k+ := k+ − min
    END IF
    RETURN V+
END ALGORITHM ijkToIjk+
```

In a so-called ij coordinate system each hexagon can be assigned the smallest magnitude coordinates relative to the i and j axes; the k component in an ij coordinate system is always zero. The ij coordinates ($i^{ij}$, $j^{ij}$, $k^{ij}$) of an arbitrary ijk+ coordinate triplet (i, j, k) are given by the following algorithm:

```
ALGORITHM ijkToIj TAKES ijk+ VECTOR V = (i, j, k)
    RETURNS ij VECTOR Vij = (iij, jij, kij)
```

-continued

```
    iij := i − k
    jij := j − k
    kij := 0
    RETURN Vij
END ALGORITHM ijkToIj
```

A cell in an ij coordinate system in which a point on the real number plane is contained (i.e., a spatial location) can be obtained by the following procedure, wherein the origin of the two systems coincide, the i-axis of the ij coordinate system coincides with the x-axis of a Cartesian coordinate system, and the distance between adjacent cells in the ij coordinate system corresponds to one unit in the Cartesian coordinate system:

```
ALGORITHM xyToIj
    TAKES TWO-DIMENSIONAL CARTESIAN VECTOR R = (x, y)
    RETURNS ij VECTOR Vij = (iij, jij, kij)
    a1 := ABSOLUTE VALUE OF x
    a2 := ABSOLUTE VALUE OF y
    x2 := a2 / sin(60)
    x1 := a1 + x2 / 2
    m1 := LARGEST INTEGER LESS THAN x1
    m2 := LARGEST INTEGER LESS THAN x2
    r1 := x1 − m1
    r2 := x2 − m2
    IF r1 IS LESS THAN ½ THEN
        IF r1 IS LESS THAN ⅓ THEN
            IF r2 IS LESS THAN (1 + r1) / 2 THEN
                iij := m1
                jij := m2
            ELSE
                iij := m1
                jij := m2 + 1
            END IF
        ELSE
            IF r2 IS LESS THAN 1 − r1 THEN
                jij := m2
            ELSE
                jij := m2 + 1
            END IF
            IF 1 − r1 IS LESS THAN OR EQUAL TO r2 AND
                    r2 IS LESS THAN 2 * r1 THEN
                iij := m1 + 1
            ELSE
                iij := m1
            END IF
        END IF
    ELSE
        IF r1 IS LESS THAN ⅔ THEN
            IF r2 IS LESS THAN 1 − r1 THEN
                jij := m2
            ELSE
                jij := m2 + 1
            END IF
            IF 2 * r1 − 1 IS LESS THAN r2
                    AND r2 IS LESS THAN 1 − r1 THEN
                iij := m1
            ELSE
                iij := m1 + 1
            END IF
        ELSE
            IF r2 IS LESS THAN r1 / 2 THEN
                iij := m1 + 1
                jij := m2
            ELSE
                iij := m1 + 1
                jij := m2 + 1
            END IF
        END IF
    END IF
    IF x IS LESS THAN 0 THEN
        IF jij IS EVEN THEN
            iij := iij − 2 * (iij − jij / 2)
        ELSE
```

-continued

```
        i^ij := i^ij − (2 * (i^ij − (j^ij + 1) / 2) + 1)
      END IF
    END IF
    IF y IS LESS THAN 0 THEN
        i^ij := i^ij − (2 * j^ij + 1) / 2
        j^ij := −1 * j^ij
    END IF
    RETURN V^ij
END ALGORITHM xyToIj
```

The center point of a cell in ij coordinates can be converted to Cartesian coordinates using the following algorithm, where the origin of the two systems coincide, the i-axis of the ij coordinate system coincides with the x-axis of the Cartesian coordinate system, and the distance between adjacent cells in the ij coordinate system corresponds to one unit in the Cartesian coordinate system.

```
ALGORITHM ijToXy
    TAKES ij VECTOR V^ij = (i^ij, j^ij, k^ij)
    RETURNS TWO-DIMENSIONAL CARTESIAN VECTOR R = (x, y)
    x := i^ij − (j^ij * ½)
    y := j^ij − (1.5 * 1/sqrt(3))
    RETURN R
END ALGORITHM ijToXy
```

CPI System Definition on a Valence 6 Vertex

Returning to FIG. 16A, when a single base cell is formed on a vertex of M with a valence of 6 (such as vertex 1602), the resulting voronoi cell 1610 on an ideal CPI manifold 1600 will be a planar hexagon. The central place children of a valence 6 resolution b parent cell $c_b$ consist of an appropriately scaled and rotated resolution b+1 cells centered on $c_b$, and six adjacent resolution b+1 cells. In the case of A3, the central place children of $c_b$ have ⅓ the area of $c_b$ and are rotated 30° counter-clockwise or clockwise relative to $c_b$. For example, in FIG. 19A, a hexagon 1902 can be the parent cell and its A3 central place children are a center child 1904 and vertex children 1906-1916, which are each ⅓ the area of cell 1902 and rotated 30° relative to cell 1902. As shown by angle 1926, the central place children of cell 1902 are rotated 30° clockwise such that an i-axis 1920 rotates to the rotated axis 1928.

For A4, the central place children have ¼ the area of $c_b$ and will not be rotated. For example, in FIG. 20A, a hexagon 2002 can be the parent cell and its A4 central place children are a center child 2004 and edge children 2006-2016, which each have ¼ the area of the parent hexagon 2002 and are not rotated relative to the parent cell 2002.

Figure 21:
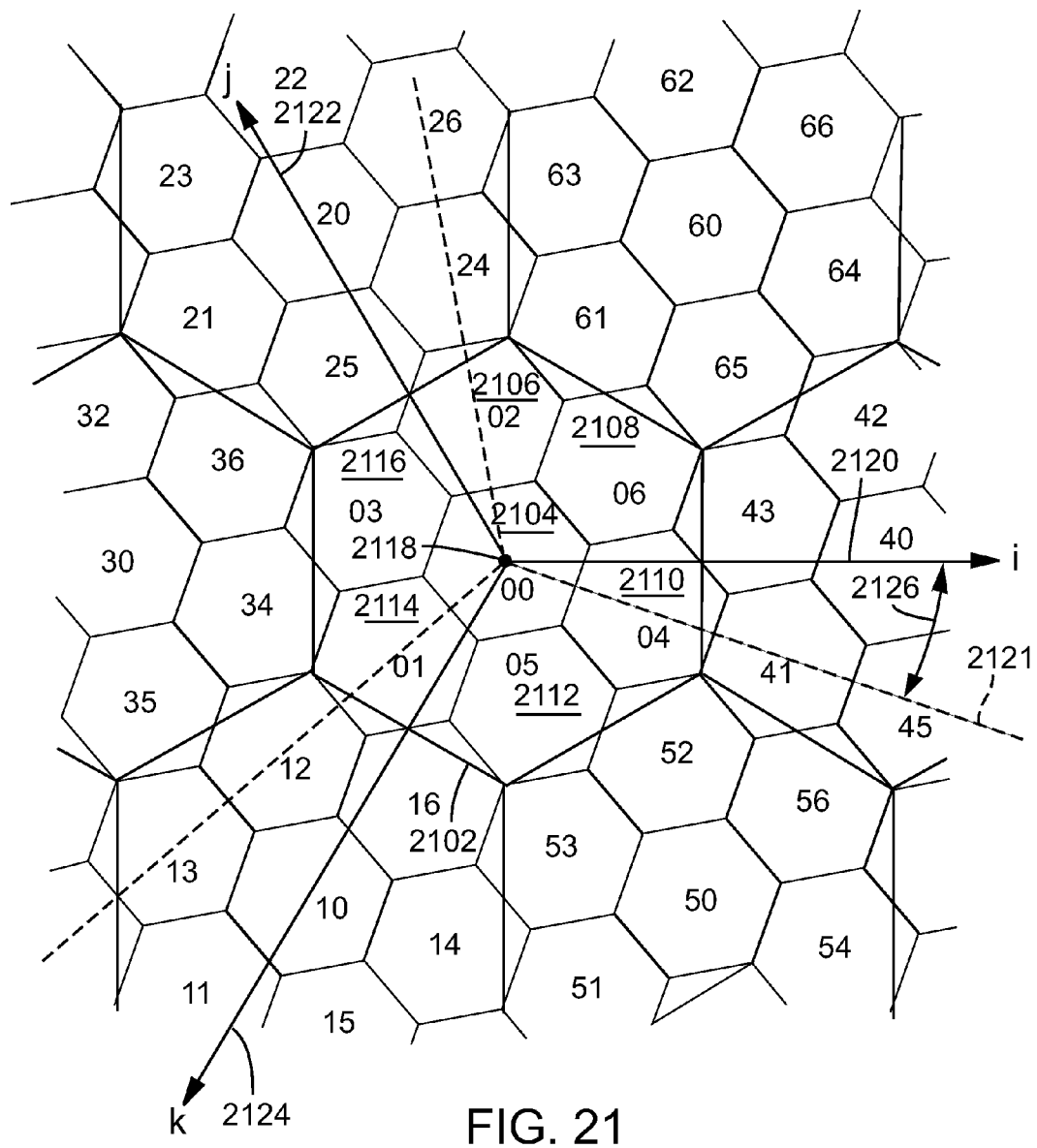

For A7, the central place children will have ⅐ the area of $c_b$ and will be rotated by asin(sqrt(3.0/28.0)) degrees (approximately 19.1°) counter-clockwise or clockwise relative with respect to the parent cell. For example, as shown in FIG. 21, a hexagon 2102 can be the parent cell and its A7 central place children are a center child 2104 and children 2106-2116, each of which has an area that is ⅐ the area of the parent hexagon 2102 and are rotated about 19.1° clockwise relative to the parent hexagon 2002. The central place children of cell 2102 are rotated by an angle 2126 clockwise from i-axis 2120 to a rotated axis 2121.

Note that the same central place children are geometrically generated by clockwise and counter-clockwise rotations in aperture A3 (but not aperture A7). These will however generate different indexings, as described below.

Figure 16B:
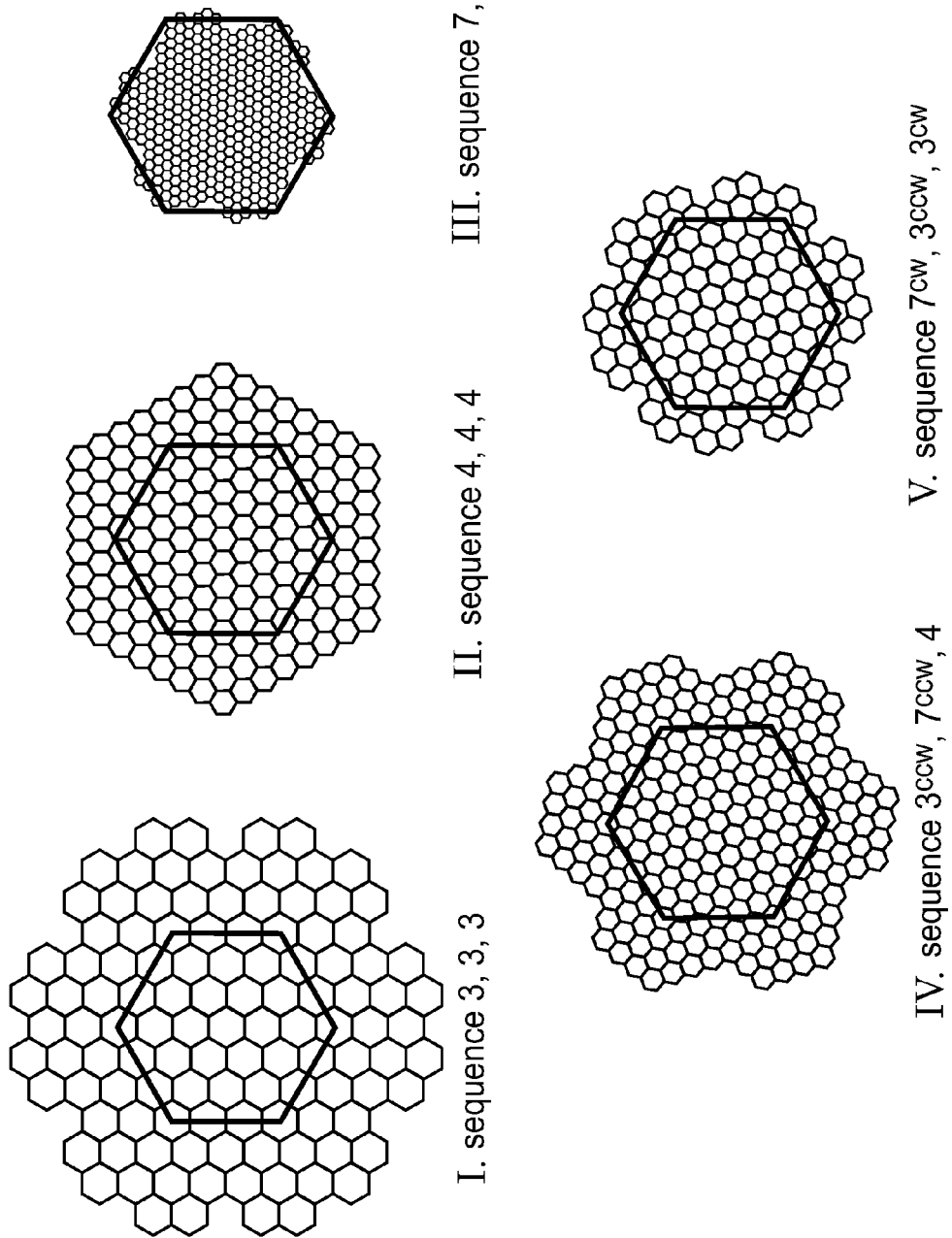
FIGS. 16B-16C show exemplary resolution b+3 Christaller sets.

This process can be applied recursively at resolutions b+2, b+3, etc. until a desired resolution is achieved by choosing the appropriate apertures and rotations for each resolution as given in a CPI system specification. The resulting set of cells at resolution r (where r>b) is called the resolution r Christaller set of $c_b$. FIG. 16B illustrates resolution b+3 Christaller sets generated by some representative pure and mixed aperture sequences. Sets I, II and III show resolution b+3 Christaller sets generated by pure A3, A4, and A7 sequences, respectively in which all A3 and A7 resolutions are associated with counter-clockwise rotations. Sets IV and V show resolution b+3 Christaller sets generated by representative mixed aperture sequences as specified.

An integer location code (or codes) can be assigned to a resolution r (where r≥b) cell $c_r$ in the Christaller set of $c_b$ as follows. A location code of $c_r$ can be formed of a prefix which is an integer location code of $c_b$, with a single digit concatenated to it for each resolution from b+1 to r inclusive. Since each cell has 7 central place children, the digits 0, 1, 2, . . . , 6 are a convenient choice for these additional digits. The assignment of digits should be geometrically consistent, and can be specified by assigning each digit to a child relative to that child's position in a local coordinate system at that child's resolution. One assignment, which is used hereinafter, is shown in FIG. 17. In FIG. 17, a center cell 1702 is assigned the digit 0, a first cell in a k-direction 1708 is assigned a digit 1, a first cell in a j-direction is assigned a digit 2, etc. This digit assignment can be applied at multiple resolutions and defined relative to the ijk coordinate system at each resolution.

The CPI index (or indices) for $c_r$ are formed by following one (or more) of the hierarchical path(s) through the Christaller set of $c_b$ that generate $c_r$. The resulting location code(s) are called CPI indexes of $c_r$.

In order to complete a CPI system specification using valence 6 (hexagonal) base tiles, a formal definition of the cell generators need to be defined. Since each cell in a CPI system has at most 7 children, the generator for a resolution b cell $c_b$ can be specified as a string of 7 values $g_0 g_1 g_2 g_3 g_4 g_5 g_6$, where each $g_i$ specifies the generator associated with the i-digit child of $c_b$ (as defined above). Using this notation, the $C^7$ generator can be defined as:

$$C^7 = C^7 C^7 C^7 C^7 C^7 C^7 C^7$$

A planar CPI system can then be specified as follows. Base tile cell points can be defined as vertices of a regular triangular lattice, and each base tile can be assigned the $C^7$ generator. Then, a sequence of A3 (counter-clockwise and/or clockwise), A4, and/or A7 (counter-clockwise and/or clockwise) can be defined. Each resolution r of the Christaller set of $c_b$ can be created using a consistent scaling and rotation across all cells at that resolution, relative to the previous resolution r−1. Thus, all resolution r cells lie on a regular hexagonal grid which is scaled by the product of the resolution b+1 to r scaling factors, and rotated by the sum of the resolution b+1 to r rotations (as illustrated, for example, in FIG. 16B).

A scaling factor $s_r$ for resolution r relative to resolution 0 in a CPI system with aperture sequence A (wherein $A_q$ designates the aperture of resolution q) is given by:

$$s_r = \prod_{q=1}^{r} \frac{1}{\sqrt{A_q}}$$

The rotation angle $d_r$ for a resolution r relative to resolution 0 in a CPI system with aperture sequence A is a sum of prior rotations, wherein rotation(a) can be determined based on the following procedure:

```
ALGORITHM rotation TAKES APERTURE TYPE a
    RETURNS ROTATION ANGLE d
    DECLARE ap7rot := asin(sqrt(3.0 / 28.0)) DEGREES
    IF a IS EQUAL TO 3^ccw THEN
        d := 30 DEGREES
    ELSE IF a IS EQUAL TO 3^cw THEN
        d := -30 DEGREES
    ELSE IF a IS EQUAL TO 4 THEN
        d := 0 DEGREES
    ELSE IF a IS EQUAL TO 7^ccw THEN
        d := ap7rot
    ELSE IF a IS EQUAL TO 7^cw THEN
        d := -1 * ap7rot
    RETURN d
END ALGORITHM rotation
```

Given a base cell $c_b$ and the CPI index of a resolution r cell $c_r$, in the Christaller set of $c_b$, coordinates of $c_r$ can be determined in the resolution r ijk coordinate system as given in procedure cpiToIjk below. The algorithm assumes that the first (resolution 0) character in the CPI index string parameter indicates the base tile $c_b$. Note that definitions of all procedures used by this procedure are given below the procedure definition.

```
ALGORITHM cpiToIjk
    TAKES VECTOR c_b = (i_b, j_b, k_b)
        AND APERTURE SEQUENCE A
        AND RESOLUTION r CPI INDEX STRING cpi
    RETURNS VECTOR V_r = (i_r, j_r, k_r)
    V_r := c_b
    FOREACH RESOLUTION q FROM 1 TO r
        a_q := RESOLUTION q APERTURE TYPE IN A
        IF a_q IS EQUAL TO 3^ccw THEN
            center := CALL down3^ccw WITH V_r
        ELSE IF a_q IS EQUAL TO 3^cw THEN
            center := CALL down3^cw WITH V_r
        ELSE IF a_q IS EQUAL TO 4 THEN
            center := CALL down4 WITH V_r
        ELSE IF a_q IS EQUAL TO 7^ccw THEN
            center := CALL down7^ccw WITH V_r
        ELSE IF a_q IS EQUAL TO 7^cw THEN
            center := CALL down7^cw WITH V_r
        d_q := RESOLUTION q DIGIT IN cpi
        V_r := CALL offsetFromCenter WITH center AND d_q
    END FOREACH
    RETURN V_r
END ALGORITHM cpiToIjk
ALGORITHM down3^ccw TAKES VECTOR V_s = (i_s, j_s, k_s)
    RETURNS VECTOR V_{s+1} = (i_{s+1}, j_{s+1}, k_{s+1})
    VECTOR V^i := (2, 0, 1)
    VECTOR V^j := (1, 2, 0)
    VECTOR V^k := (0, 1, 2)
    V_{s+1} := (V^i * i_s) + (V^j * j_s) + (V^k * k_s)
    RETURN V_{s+1}
END ALGORITHM down3^ccw
ALGORITHM down3^cw TAKES VECTOR V_s = (i_s, j_s, k_s)
    RETURNS VECTOR V_{s+1} = (i_{s+1}, j_{s+1}, k_{s+1})
    VECTOR V^i := (2, 1, 0)
    VECTOR V^j := (0, 2, 1)
    VECTOR V^k := (1, 0, 2)
    V_{s+1} := (V^i * i_s) + (V^j * j_s) + (V^k * k_s)
    RETURN V_{s+1}
END ALGORITHM down3^cw
ALGORITHM down4 TAKES VECTOR V_s = (i_s, j_s, k_s)
    RETURNS VECTOR V_{s+1} = (i_{s+1}, j_{s+1}, k_{s+1})
    V_{s+1} := V_s * 2
    RETURN V_{s+1}
END ALGORITHM down4
ALGORITHM down7^ccw TAKES VECTOR V_s = (i_s, j_s, k_s)
    RETURNS VECTOR V_{s+1} = (i_{s+1}, j_{s+1}, k_{s+1})
    VECTOR V^i := (3, 0, 1)
    VECTOR V^j := (1, 3, 0)
    VECTOR V^k := (0, 1, 3)
    V_{s+1} := (V^i * i_s) + (V^j * j_s) + (V^k * k_s)
    RETURN V_{s+1}
END ALGORITHM down7^ccw
ALGORITHM down7^cw TAKES VECTOR V_s = (i_s, j_s, k_s)
    RETURNS VECTOR V_{s+1} = (i_{s+1}, j_{s+1}, k_{s+1})
    VECTOR V^i := (3, 1, 0)
    VECTOR V^j := (0, 3, 1)
    VECTOR V^k := (1, 0, 3)
    V_{s+1} := (V^i * i_s) + (V^j * j_s) + (V^k * k_s)
    RETURN V_{s+1}
END ALGORITHM down7^cw
ALGORITHM offsetFromCenter
    TAKES VECTOR center = (i_c, j_c, k_c)
        AND DIGIT d
    RETURNS VECTOR V = (i, j, k)
    VECTOR V^0 := (0, 0, 0)
    VECTOR V^1 := (0, 0, 1)
    VECTOR V^2 := (0, 1, 0)
    VECTOR V^3 := (0, 1, 1)
    VECTOR V^4 := (1, 0, 0)
    VECTOR V^5 := (1, 0, 1)
    VECTOR V^6 := (1, 1, 0)
    IF d IS EQUAL TO 0 THEN
        V := center + V^0
    ELSE IF d IS EQUAL TO 1 THEN
        V := center + V^1
    ELSE IF d IS EQUAL TO 2 THEN
        V := center + V^2
    ELSE IF d IS EQUAL TO 3 THEN
        V := center + V^3
    ELSE IF d IS EQUAL TO 4 THEN
        V := center + V^4
    ELSE IF d IS EQUAL TO 5 THEN
        V := center + V^5
    ELSE IF d IS EQUAL TO 6 THEN
        V := center + V^6
    RETURN V
END ALGORITHM offsetFromCenter
```

Conversely, given a CPI system and resolution r ijk+ coordinates of a cell $c_r$, a CPI index string for $c_r$ can be specified as given in procedure ijkToCpi below. In the case of A3 and A4 resolutions, the parent cell is chosen so as to minimize the magnitude of the parent's ijk+ vector. Note that definitions of all procedures used that have not been previously defined are given below the procedure definition.

```
ALGORITHM ijkToCpi
    TAKES BASE TILE SPECIFIER c_b
        AND RESOLUTION r ijk+ VECTOR c_r = (i_r, j_r, k_r)
        AND APERTURE SEQUENCE A
    RETURNS CPI INDEX STRING cpi
        AND RESOLUTION 0 BASE TILE ijk+ VECTOR B_0 = (i_0, j_0, k_0)
    DECLARE EMPTY CPI INDEX STRING cpiRev
    V := c_r
    FOREACH RESOLUTION q FROM r DOWN TO 1
        a_q := RESOLUTION q APERTURE TYPE IN A
        DECLARE VECTOR center_q
        DECLARE VECTOR center_{q-1}
        IF a_q IS EQUAL TO 3^ccw THEN
            center_q, center_{q-1} := CALL lift3^ccw WITH V
        ELSE IF a_q IS EQUAL TO 3^cw THEN
            center_q, center_{q-1} := CALL lift3^cw WITH V
        ELSE IF a_q IS EQUAL TO 4 THEN
            center_q, center_{q-1} := CALL lift4 WITH V
        ELSE IF a_q IS EQUAL TO 7^ccw THEN
            center_q, center_{q-1} := CALL lift7^ccw WITH V
        ELSE IF a_q IS EQUAL TO 7^cw THEN
            center_q, center_{q-1} := CALL lift7^cw WITH V
        VECTOR diffVector := V - center_q
        diffVector+ := CALL ijkToIjk+ WITH diffVector
        DIGIT d_q := CALL vectorToDigit WITH diffVector+
        cpiRev := CONCATENATE cpiRev WITH d_q
        V := center_{q-1}
    END FOREACH
    B_0 := V
```

```
    cpi := REVERSE STRING cpiRev
    RETURN cpi, B_0
END ALGORITHM ijkToCpi
ALGORITHM lift3^{ccw} TAKES ijk^+ VECTOR V_s = (i_s, j_s, k_s)
        RETURNS ijk^+ VECTOR center_s = (ci_s, cj_s, ck_s)
            AND ijk^+ VECTOR center_{s-1} = (ci_{s-1}, cj_{s-1}, ck_{s-1})
    center_s := CALL center3 WITH V_s
    DECLARE VECTOR c^{ij} = (i^{ij}, j^{ij}, k^{ij})
    c^{ij} := CALL ijkToIj WITH center_s
    ci_{s-1} := (2 * i^{ij} – j^{ij}) / 3
    cj_{s-1} := i^{ij} – ci_{s-1}
    ck_{s-1} := 0
    center_{s-1} := CALL ijkToIjk+ WITH center_{s-1}
    RETURN center_s, center_{s-1}
END ALGORITHM lift3^{ccw}
ALGORITHM lift3^{cw} TAKES ijk^+ VECTOR V_s = (i_s, j_s, k_s)
        RETURNS ijk^+ VECTOR center_s = (ci_s, cj_s, ck_s)
            AND ijk^+ VECTOR center_{s-1} = (ci_{s-1}, ci_{s-1}, ck_{s-1})
    center_s := CALL center3 WITH V_s
    DECLARE VECTOR c^{ij} = (i^{ij}, j^{ij}, k^{ij})
    c^{ij} := CALL ijkToIj WITH center_s
    cj_{s-1} := (2 * j^{ij} – i^{ij}) / 3
    ci_{s-1} := j^{ij} – cj_{s-1}
    ck_{s-1} := 0
    center_{s-1} := CALL ijkToIjk+ WITH center_{s-1}
    RETURN center_s, center_{s-1}
END ALGORITHM lift3^{cw}
ALGORITHM center3 TAKES ijk^+ VECTOR V_s = (i_s, j_s, k_s)
        RETURNS ijk^+ VECTOR center_s = (ci_s, cj_s, ck_s)
    mod := (i_s + j_s + k_s) MODULO 3
    IF mod IS EQUAL TO 0 THEN
        center_s := V_s
    ELSE IF mod IS EQUAL TO 1 THEN
        center_s := V_s
        DECREMENT BY 1 THE MAXIMUM COMPONENT IN
        center_s
    ELSE IF mod IS EQUAL TO 2 THEN
        center_s := V_s
        numPos := NUMBER OF COMPONENTS IN center_s
            THAT ARE GREATER THAN ZERO
        IF numPos IS EQUAL TO 1 THEN
            INCREMENT BY 1 THE FIRST COMPONENT IN center_s
                THAT IS EQUAL TO ZERO
        ELSE IF numPos IS EQUAL TO 2 THEN
            DECREMENT BY 1 THE TWO COMPONENTS IN
            center_s
                THAT ARE GREATER THAN ZERO
        END IF
    END IF
    RETURN center_s
END ALGORITHM center3
ALGORITHM lift4 TAKES ijk^+ VECTOR V_s = (i_s, j_s, k_s)
        RETURNS ijk^+ VECTOR center_s = (ci_s, cj_s, ck_s)
            AND ijk^+ VECTOR center_{s-1} = (ci_{s-1}, cj_{s-1}, ck_{s-1})
    ci_{s-1} := LARGEST INTEGER LESS THAN OR EQUAL TO (i_s / 2)
    cj_{s-1} := LARGEST INTEGER LESS THAN OR EQUAL TO (j_s / 2)
    ck_{s-1} := LARGEST INTEGER LESS THAN OR EQUAL TO (k_s / 2)
    center_s := CALL down4 WITH center_{s-1}
    RETURN center_s, center_{s-1}
END ALGORITHM lift4
ALGORITHM lift7^{ccw} TAKES ijk^+ VECTOR V_s = (i_s, j_s, k_s)
        RETURNS ijk^+ VECTOR center_s = (ci_s, cj_s, ck_s)
            AND ijk^+ VECTOR center_{s-1} = (ci_{s-1}, cj_{s-1}, ck_{s-1})
    DECLARE VECTOR V^{ij} = (i^{ij}, j^{ij}, k^{ij})
    V^{ij} := CALL ijkToIj WITH V_s
    ci_{s-1} := ROUND TO NEAREST INTEGER ((3.0 * i^{ij} – j^{ij}) / 7.0)
    cj_{s-1} := ROUND TO NEAREST INTEGER ((i^{ij} + 2.0 * j^{ij}) / 7.0)
    ck_{s-1} := 0
    center_{s-1} := CALL ijkToIjk+ WITH center_{s-1}
    center_s := CALL down7^{ccw} WITH center_{s-1}
    RETURN center_s, center_{s-1}
END ALGORITHM lift7^{ccw}
ALGORITHM lift7^{cw} TAKES ijk^+ VECTOR V_s = (i_s, j_s, k_s)
        RETURNS ijk^+ VECTOR center_s = (ci_s, cj_s, ck_s)
            AND ijk^+ VECTOR center_{s-1} = (ci_{s-1}, cj_{s-1}, ck_{s-1})
    DECLARE VECTOR V^{ij} = (i^{ij}, j^{ij}, k^{ij})
    V^{ij} := CALL ijkToIj WITH V_s
    ci_{s-1} := ROUND TO NEAREST INTEGER ((2.0 * i^{ij} + j^{ij}) / 7.0)
    cj_{s-1} := ROUND TO NEAREST INTEGER ((3.0 * j^{ij} – i^{ij}) / 7.0)
    ck_{s-1} := 0
    center_{s-1} := CALL ijkToIjk+ WITH center_{s-1}
    center_s := CALL down7^{cw} WITH center_{s-1}
    RETURN center_s, center_{s-1}
END ALGORITHM lift7^{cw}
```

Given a resolution r cell specified with a CPI index in a specific CPI system, Cartesian coordinates for the center point of the specified cell can be determined by the following exemplary steps:

1. Apply procedure cpiToIjk to determine the resolution r ijk+ coordinates of the cell;
2. Apply procedure ijkToIj to determine the resolution r ij coordinates of the cell;
3. Apply procedure ij ToXy to determine Cartesian coordinates for the cell center point.

Given a specific CPI system, the CPI index for the resolution r cell in which a point on the real number plane is contained can be determined by the following exemplary steps:

1. Translate the point so that the origin of the Cartesian coordinate system in which it is defined coincides with that of the CPI system;
2. Scale the point so that one unit in the Cartesian system corresponds to the distance between adjacent hexagons in resolution r of the CPI system;
3. Rotate the point so that the x axis of the Cartesian coordinate system coincides with the i axis of resolution r of the CPI system;
4. Apply procedure xyToIj to determine the ij coordinates of the resolution r cell in which the point is contained;
5. Apply procedure ijToIjk+ to determine the ijk+ coordinates of the resolution r cell in which the point is contained; and
6. Apply procedure ijkToCpi to produce a CPI index for the resolution r cell that contains the point.

As previously noted, hierarchical generation using $C^7$ generators under aperture sequences that include A3 and/or A4 can result in the assignment of multiple equivalent indices to some of the cells. For many uses (including unique geometric generation of cells) it is convenient to use generators that will generate/index each cell uniquely. For A7, this is automatic.

Figure 19B:
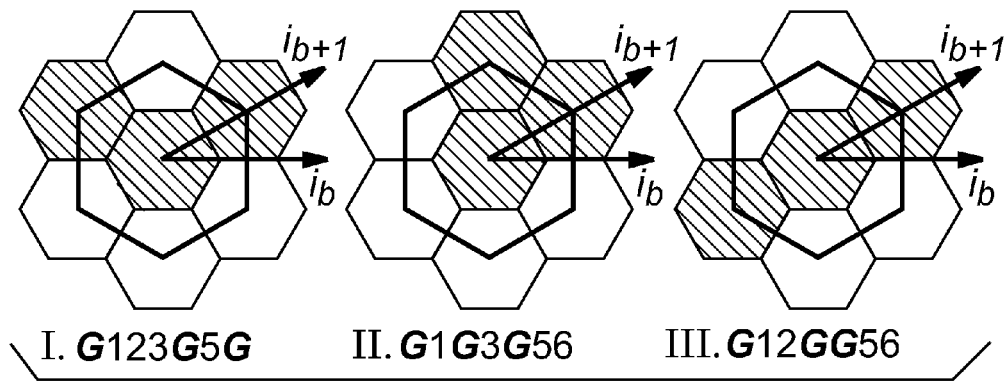
Figure 20B:
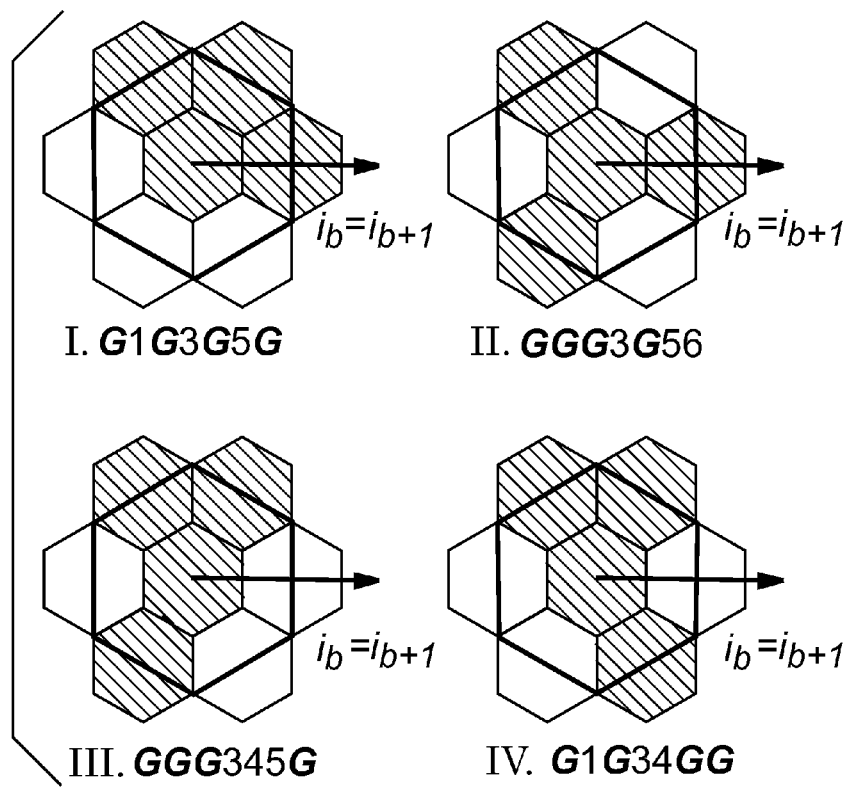

For an aperture A3 or A4, generators can be defined that generate the central (0-digit) central place child and ($\alpha$–1) of the other 6 central place children, where each such generator can tile the ideal CPI manifold. For example, FIGS. 19B and 20B illustrate possible single generators (unique under 60° rotations) for counter-clockwise A3 and A4 resolutions respectively, with their corresponding string representations. In the string representation of generators, a child cell that is not generated is indicated by replacing a generator specification with the corresponding digit. G is used to indicate an arbitrary generator type.

Note that the algorithm cpiToIjk can be used without alteration for any of these generator types. The algorithm ijkToCpi requires modification for specific generator types so that ungenerated cells at each resolution are assigned to the appropriate adjacent parent cell and with the appropriate digit for that new parent cell.

Other generators or sets of generators that tile the plane can also be used. For example, the A3 Hexagon Tree (A3HT) uses two generator types to uniquely generate A3 resolutions while preserving the full hexagonal symmetry of the generated Christaller set.

The algorithm rotate60 which follows performs a 60 degree counter-clockwise rotation of a cell specified as a CPI index string about a hierarchical indexing parent of that cell, specified as an arbitrary resolution index prefix of the cell's index.

```
ALGORITHM rotate60
    TAKES RESOLUTION r CPI INDEX STRING cpi
        AND BASE ROTATION RESOLUTION baseRes
    RETURNS RESOLUTION r CPI INDEX STRING cpi'
    cpi' := FIRST baseRes - 1 DIGITS OF cpi
    FOREACH RESOLUTION q FROM baseRes TO r
        d_q := RESOLUTION q DIGIT IN cpi
        IF d_q IS EQUAL TO 0 THEN
            cpi' := CONCATENATE cpi' WITH 0
        ELSE IF d_q IS EQUAL TO 1 THEN
            cpi' := CONCATENATE cpi' WITH 5
        ELSE IF d_q IS EQUAL TO 2 THEN
            cpi' := CONCATENATE cpi' WITH 3
        ELSE IF d_q IS EQUAL TO 3 THEN
            cpi' := CONCATENATE cpi' WITH 1
        ELSE IF d_q IS EQUAL TO 4 THEN
            cpi' := CONCATENATE cpi' WITH 6
        ELSE IF d_q IS EQUAL TO 5 THEN
            cpi' := CONCATENATE cpi' WITH 4
        ELSE IF d_q IS EQUAL TO 6 THEN
            cpi' := CONCATENATE cpi' WITH 2
    END FOREACH
    RETURN cpi'
END ALGORITHM rotate60
```

Common vector operations (such as addition/translation, multiplication/scaling, and calculating metric distance) can be performed on CPI index strings by first converting the vector operands into ijk coordinates by applying algorithm cpiToIjk, performing the desired operation in ijk coordinates, and then converting the resulting ijk vector to a CPI index string by applying algorithm ijkToCpi.

Index Addition

Figure 19A:
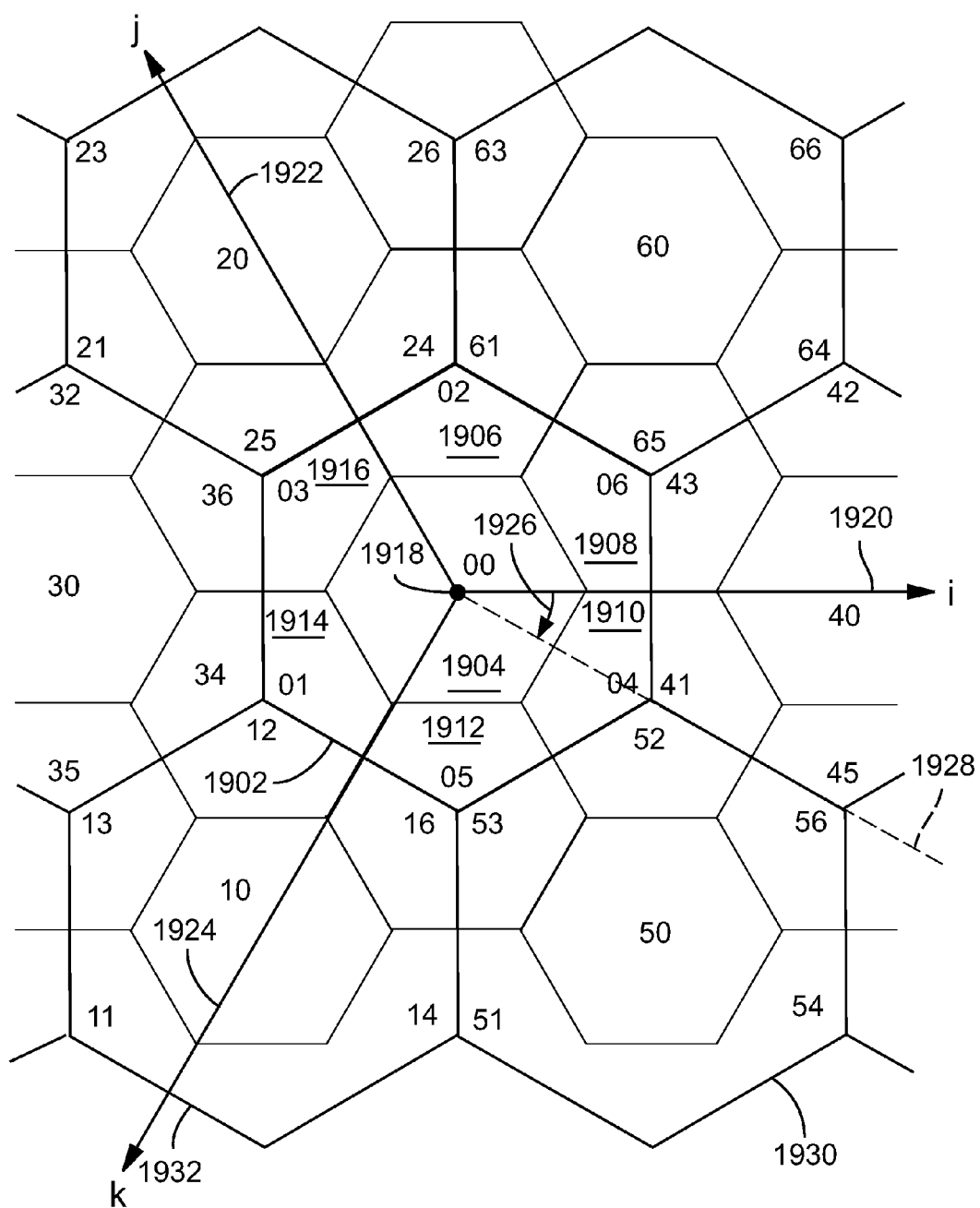
FIG. 19-21 show exemplary CPI indexing schemes for apertures 3, 4 and 7.
Figure 20A:
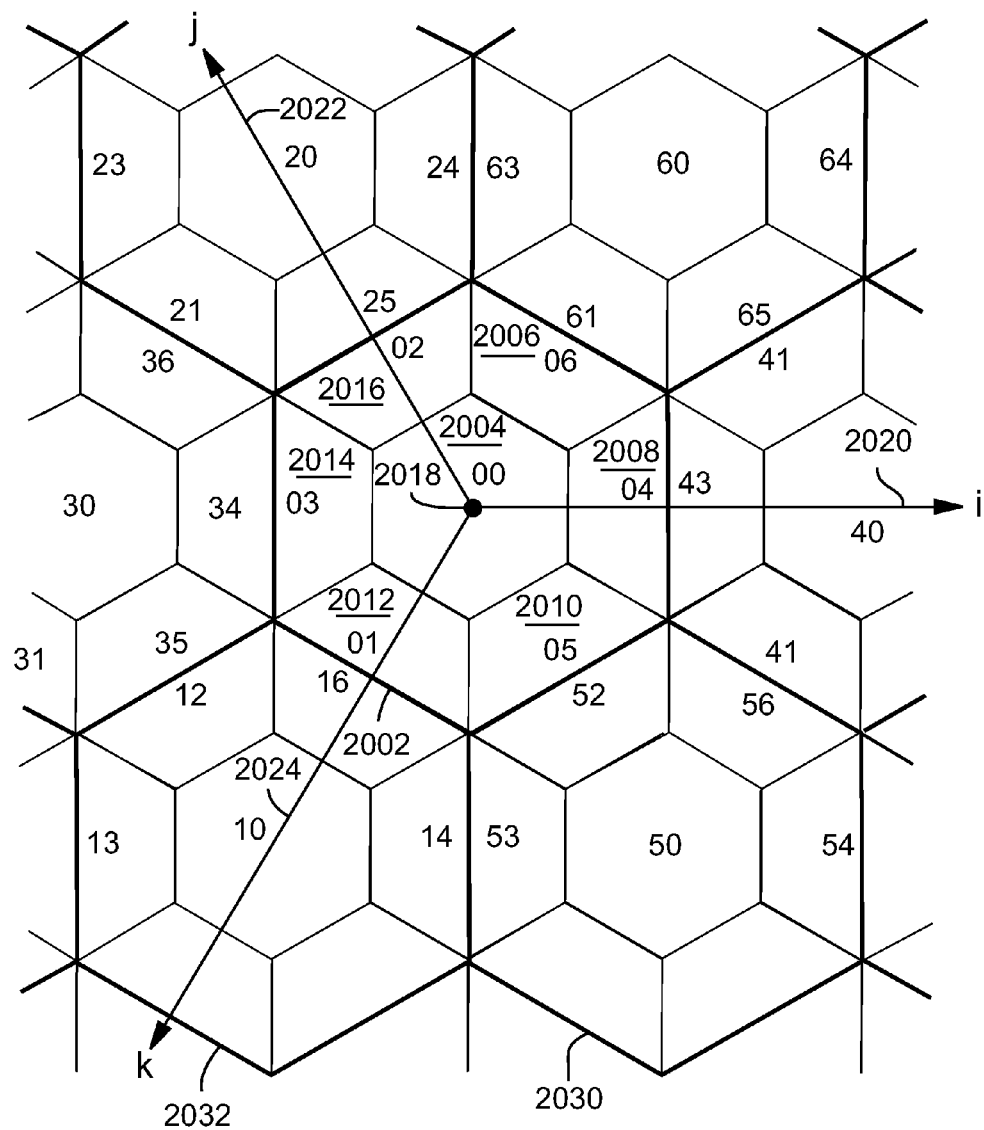

The consistent indexing patterns shown in FIGS. 19A, 20A and 21A, can allow for index addition for hexagonal CPI A3, A4 and A7 grids, respectively. Index addition can be performed using the look-up tables shown below. The left hand column and the top row of each table indicate the digit of the each cell being added together.

For example, with reference to FIG. 19A and Tables 1A and 1B, in order to add the hexagon 1910 and hexagon 1914, first the index digit for each hexagon is identified. Hexagon 1910 has the index digit 4 and hexagon 1914 has the index digit 1. Next, these digit values are applied to Tables 1A and 1B by referring to row 4, column 1. Tables 1A and 1B give the resulting sum of 5, which indicates that the sum of the hexagons 1910 and 1914 is the hexagon with the index digit 5, which is cell 1912 in FIG. 19A. Similarly, the sum of hexagon 1910 and hexagon 1910 again (hexagon 1910 multiplied by 2) is given in Table 1A by reference to the intersection of row 4 and column 4, or a sum of 45/56, corresponding to a hexagon to the lower-right of the hexagon 1910. The result 45/56 indicates two optional indices for that cell: either as a digit 5 CPI child of a larger base tile 4 to the right of the hexagon 1902, or as a digit 6 CPI child of a larger base tile 5 to the lower-right of the hexagon 1902. Tables 1A and 1B are for A3 with clockwise (CW) rotation and Tables 2A and 2B are for A3 with counterclockwise (CCW) rotation.

TABLE 1A

CPI Aperture $3^{cw}$ (with dual possible results indicated)

| + | 0 | 1 | 2 | 3 | 4 | 5 | 6 |
|---|---|---|---|---|---|---|---|
| 0 | 0 | 1 | 2 | 3 | 4 | 5 | 6 |
| 1 | 1 | 35 13 | 3 | 30 | 5 | 10 | 0 |
| 2 | 2 | 3 | 26 63 | 20 | 6 | 0 | 60 |
| 3 | 3 | 30 | 20 | 32 21 | 0 | 1 | 2 |
| 4 | 4 | 5 | 6 | 0 | 45 56 | 50 | 40 |
| 5 | 5 | 10 | 0 | 1 | 50 | 14 51 | 4 |
| 6 | 6 | 0 | 60 | 2 | 40 | 4 | 64 42 |

TABLE 1B

CPI Aperture $3^{cw}$ (with dual possible results resolved in favor of $A7^{cw}$/GBT carry values)

| + | 0 | 1 | 2 | 3 | 4 | 5 | 6 |
|---|---|---|---|---|---|---|---|
| 0 | 0 | 1 | 2 | 3 | 4 | 5 | 6 |
| 1 | 1 | 13 | 3 | 30 | 5 | 10 | 0 |
| 2 | 2 | 3 | 26 | 20 | 6 | 0 | 60 |
| 3 | 3 | 30 | 20 | 32 | 0 | 1 | 2 |
| 4 | 4 | 5 | 6 | 0 | 45 | 50 | 40 |
| 5 | 5 | 10 | 0 | 1 | 50 | 51 | 4 |
| 6 | 6 | 0 | 60 | 2 | 40 | 4 | 64 |

TABLE 2A

CPI Aperture $3^{ccw}$ Addition Table (with dual possible results indicated)

| + | 0 | 1 | 2 | 3 | 4 | 5 | 6 |
|---|---|---|---|---|---|---|---|
| 0 | 0 | 1 | 2 | 3 | 4 | 5 | 6 |
| 1 | 1 | 15 53 | 3 | 10 | 5 | 50 | 0 |
| 2 | 2 | 3 | 36 23 | 30 | 6 | 0 | 20 |
| 3 | 3 | 10 | 30 | 31 12 | 0 | 1 | 2 |
| 4 | 4 | 5 | 6 | 0 | 65 46 | 40 | 60 |
| 5 | 5 | 50 | 0 | 1 | 40 | 54 41 | 4 |
| 6 | 6 | 0 | 20 | 2 | 60 | 4 | 24 62 |

TABLE 2B

CPI Aperture $3^{ccw}$ Addition Table (with dual possible results resolved in favor of $A7^{cw}$/GBT carry values)

| + | 0 | 1 | 2 | 3 | 4 | 5 | 6 |
|---|---|---|---|---|---|---|---|
| 0 | 0 | 1 | 2 | 3 | 4 | 5 | 6 |
| 1 | 1 | 15 | 3 | 10 | 5 | 50 | 0 |
| 2 | 2 | 3 | 23 | 30 | 6 | 0 | 20 |
| 3 | 3 | 10 | 30 | 31 | 0 | 1 | 2 |
| 4 | 4 | 5 | 6 | 0 | 46 | 40 | 60 |
| 5 | 5 | 50 | 0 | 1 | 40 | 54 | 4 |
| 6 | 6 | 0 | 20 | 2 | 60 | 4 | 62 |

TABLE 3A

CPI Aperture 4 Addition Table (with dual possible results indicated)

| + | 0 | 1 | 2 | 3 | 4 | 5 | 6 |
|---|---|---|---|---|---|---|---|
| 0 | 0 | 1 | 2 | 3 | 4 | 5 | 6 |
| 1 | 1 | 10 | 3 | 12 35 | 5 | 53 14 | 0 |
| 2 | 2 | 3 | 20 | 36 21 | 6 | 0 | 24 63 |
| 3 | 3 | 12 35 | 36 21 | 30 | 0 | 1 | 2 |
| 4 | 4 | 5 | 6 | 0 | 40 | 41 56 | 65 41 |
| 5 | 5 | 53 14 | 0 | 1 | 41 56 | 50 | 4 |
| 6 | 6 | 0 | 24 63 | 2 | 65 41 | 4 | 60 |

TABLE 3B

CPI Aperture 4 Addition Table (with dual possible results resolved in favor of A7$^{cw}$/GBT carry values)

| + | 0 | 1 | 2 | 3 | 4 | 5 | 6 |
|---|---|---|---|---|---|---|---|
| 0 | 0 | 1 | 2 | 3 | 4 | 5 | 6 |
| 1 | 1 | 10 | 3 | 35 | 5 | 14 | 0 |
| 2 | 2 | 3 | 20 | 21 | 6 | 0 | 63 |
| 3 | 3 | 35 | 21 | 30 | 0 | 1 | 2 |
| 4 | 4 | 5 | 6 | 0 | 40 | 56 | 41 |
| 5 | 5 | 14 | 0 | 1 | 56 | 50 | 4 |
| 6 | 6 | 0 | 63 | 2 | 41 | 4 | 60 |

TABLE 4

CPI Aperture 7$^{cw}$ Addition Table (same as GBT)

| + | 0 | 1 | 2 | 3 | 4 | 5 | 6 |
|---|---|---|---|---|---|---|---|
| 0 | 0 | 1 | 2 | 3 | 4 | 5 | 6 |
| 1 | 1 | 12 | 3 | 34 | 5 | 16 | 0 |
| 2 | 2 | 3 | 24 | 25 | 6 | 0 | 61 |
| 3 | 3 | 34 | 25 | 36 | 0 | 1 | 2 |
| 4 | 4 | 5 | 6 | 0 | 41 | 52 | 43 |
| 5 | 5 | 16 | 0 | 1 | 52 | 53 | 4 |
| 6 | 6 | 0 | 61 | 2 | 43 | 4 | 65 |

TABLE 5

CPI Aperture 7$^{ccw}$ Addition Table

| + | 0 | 1 | 2 | 3 | 4 | 5 | 6 |
|---|---|---|---|---|---|---|---|
| 0 | 0 | 1 | 2 | 3 | 4 | 5 | 6 |
| 1 | 1 | 14 | 3 | 16 | 5 | 52 | 0 |
| 2 | 2 | 3 | 21 | 34 | 6 | 0 | 25 |
| 3 | 3 | 16 | 34 | 35 | 0 | 1 | 2 |
| 4 | 4 | 5 | 6 | 0 | 42 | 43 | 61 |
| 5 | 5 | 52 | 0 | 1 | 43 | 56 | 4 |
| 6 | 6 | 0 | 25 | 2 | 61 | 4 | 63 |

Tables 3A, 3B and 4-5, with reference to FIGS. 20A and 21, can similarly be used for A4 and A7 addition, respectively.

The second set of results in Tables 1B, 2B, and 3B shows all dual possible results resolved in favor of A7 (clockwise) carry values.

Subtraction, multiplication other mathematical functions can also be performed in a similar manner. For example, an application can bitwise complement the second operand (to negate it) and then add to perform subtraction.

Similar functions can be used to calculate a metric distance between two hexagons, among other useful application. For example, a metric distance function can include the following steps:

1. Subtract indices associated with two cells to get difference vector;
2. Convert the difference vector to a three-dimensional index; and
3. Use three-dimensional indexing metric distance operations.

CPI System Definition on Vertexes with Valences less than 6

CPI systems can also be defined on vertices with valences of less than 6. These can be defined by embedding them onto a connected set of valence 6 vertices, and then assigning to them generators that do not generate all of the sub-sequences of a complete valence 6 Christaller set.

For example, the $C^6$ generator, which generates the complete Christaller set for a valence 5 vertex, can be designated as:

$$C^6 = C^6C^7C^73C^7C^7C^7.$$

Thus, cell having index 0 is used with generator $C^6$, the cell having index 3 is not used to generate children, and cells with other indices are used with generator $C^7$.

Figure 16C:
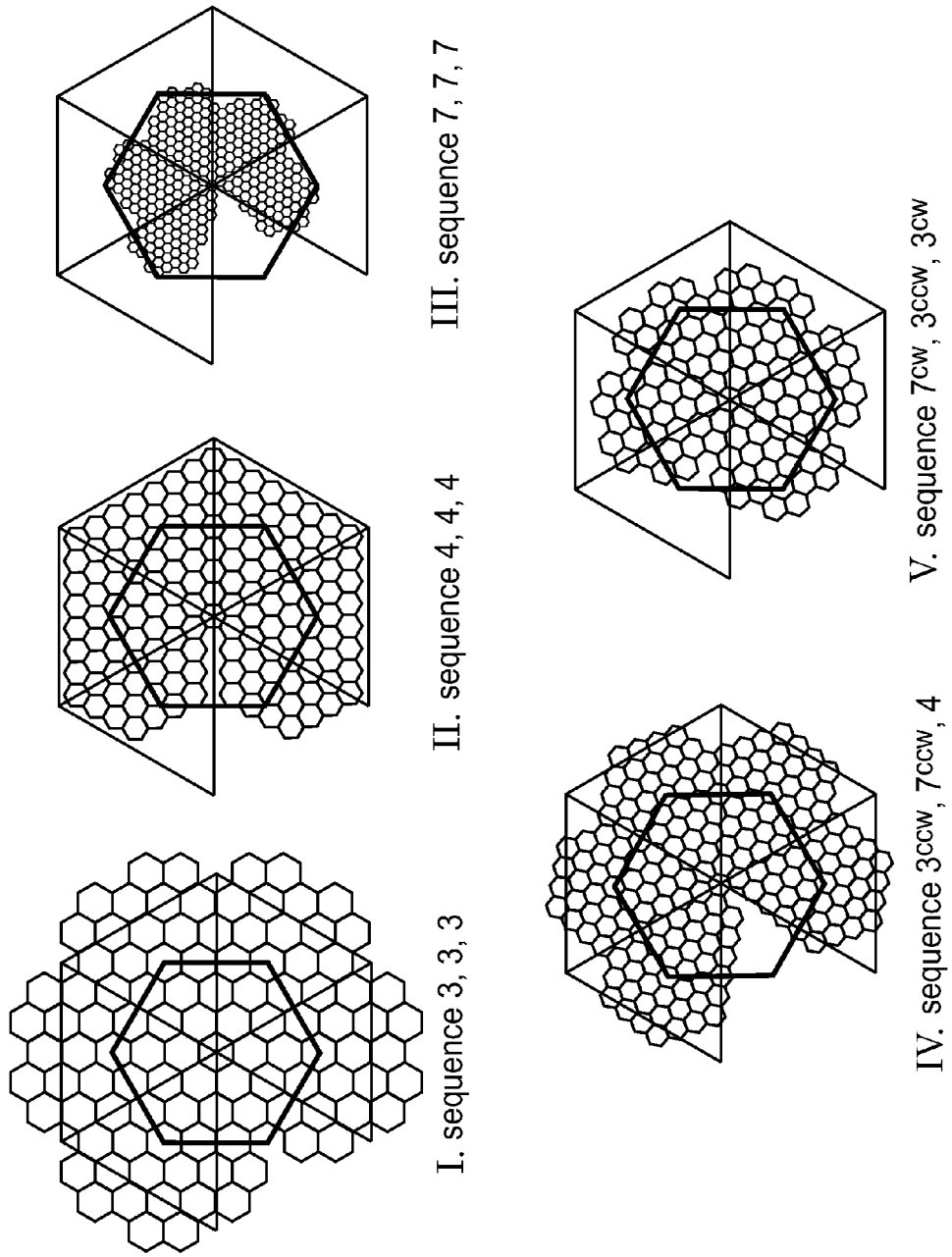

FIG. 16C illustrates the $C^6$ generator applied to a single base tile with a variety of aperture sequences. Sequences I-III show resolution b+3 Christaller sets generated on a valence 5 base tile by pure aperture 3, 4, and 7 sequences respectively. All aperture 3 and 7 resolutions have counter-clockwise rotations. Sequences IV and V show resolution b+3 Christaller sets generated on a valence 5 base tile by representative mixed aperture sequences as specified.

In the $C^6$ generator, a single sub-sequence is chosen for non-generation. As defined above, the sub-sequence associated with digit 3 can be chosen arbitrarily. The specific sub-sequence for deletion can be chosen based on the needs of a particular grid construction, and in any event the same Christaller set cells can always be re-indexed with a different non-generated sub-sequence by performing a 60 degree rotation on the sub-sequences that lie geometrically in between the current and desired choices. This also enables the construction of multiple valence 6 planar embeddings of portions of a non-valence-6 manifold for the construction of particular algorithms. For example, a separate localized embedding can be constructed for each triangular face of a manifold, such that the Christaller set of each of the three adjacent vertexes fully covers that face on the plane; this allows points that lie on that face to be assigned CPI indexes using the algorithms defined above.

Similarly, the $C^5$ generator, which generates the complete Christaller set for a valence 4 vertex, can be designated by not generating two of the sub-sequences of the full valence 6 Christaller set (in this case those associated with digits 3 and 4) as follows:

$$C^5 = C^5C^7C^734C^7C^7,$$

and so forth to create the Christaller sets of vertices with lesser valences.

Just as in the case of valence 6 vertices, note that in aperture sequences that include A3 and/or A4, some of the cells in the Christaller set will be geometrically generated (and indexed) multiple times. Generators that assign unique cell indexes and that maintain the full hexagonal symmetry of the base tiles (such as A3HT) can be used directly with vertices of any valence, simply by not generating the appropriate number of sub-sequence(s) under these generators, as was done above with the full Christaller set. Other generators may need to be adapted to the particular symmetries associated with the underlying manifold. An example of this are the grids shown in FIGS. 22A and 22E, which provide a unique indexing for a mixed A3 and A4 CPI system defined on the valence 5 base tiles associated with the vertexes of an icosahedron.

Examples of Useful CPI Systems

Figure 22A:
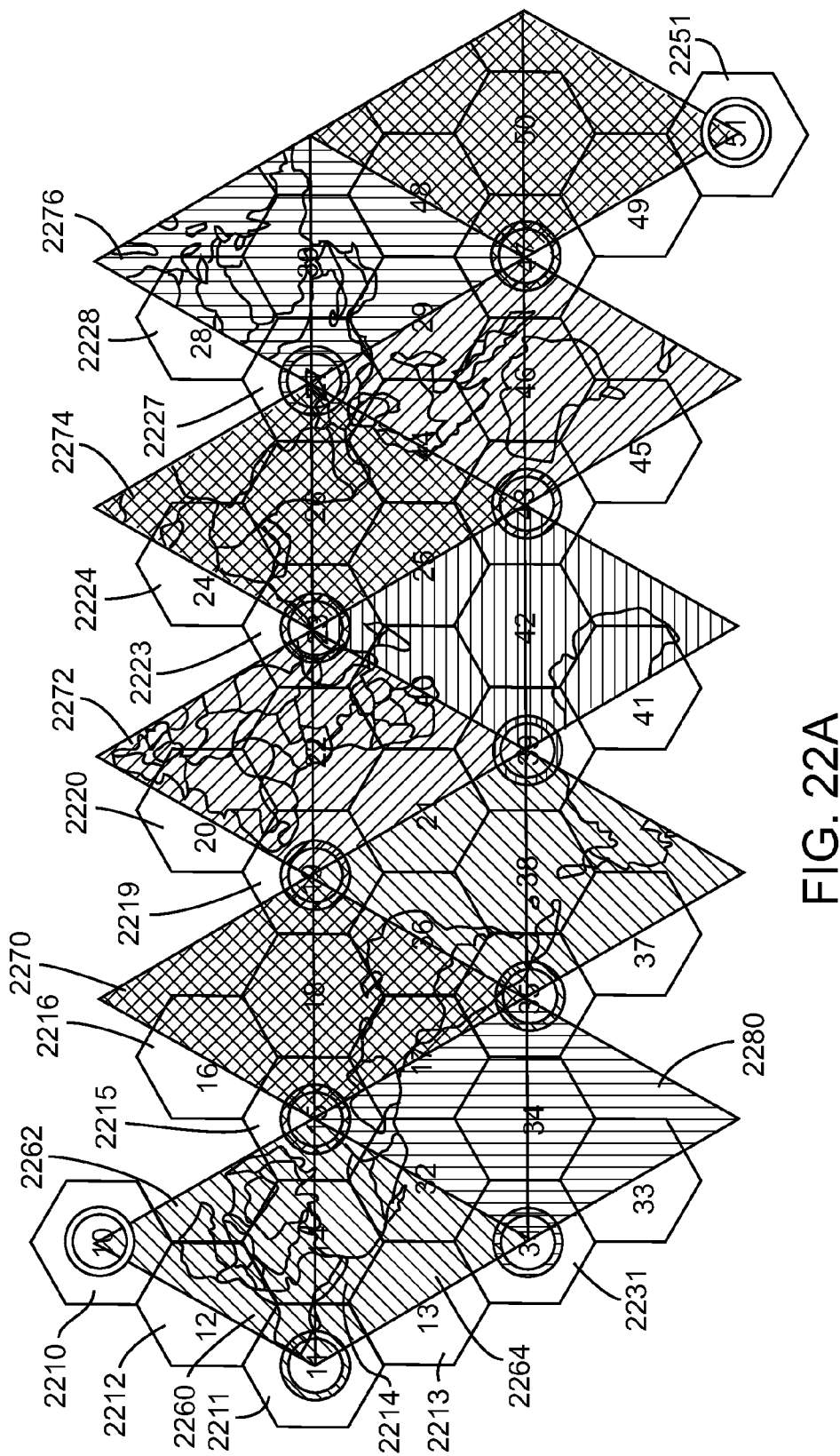
FIG. 22A-22F show exemplary CPI systems in relation to an icosahedron.
Figure 22B:
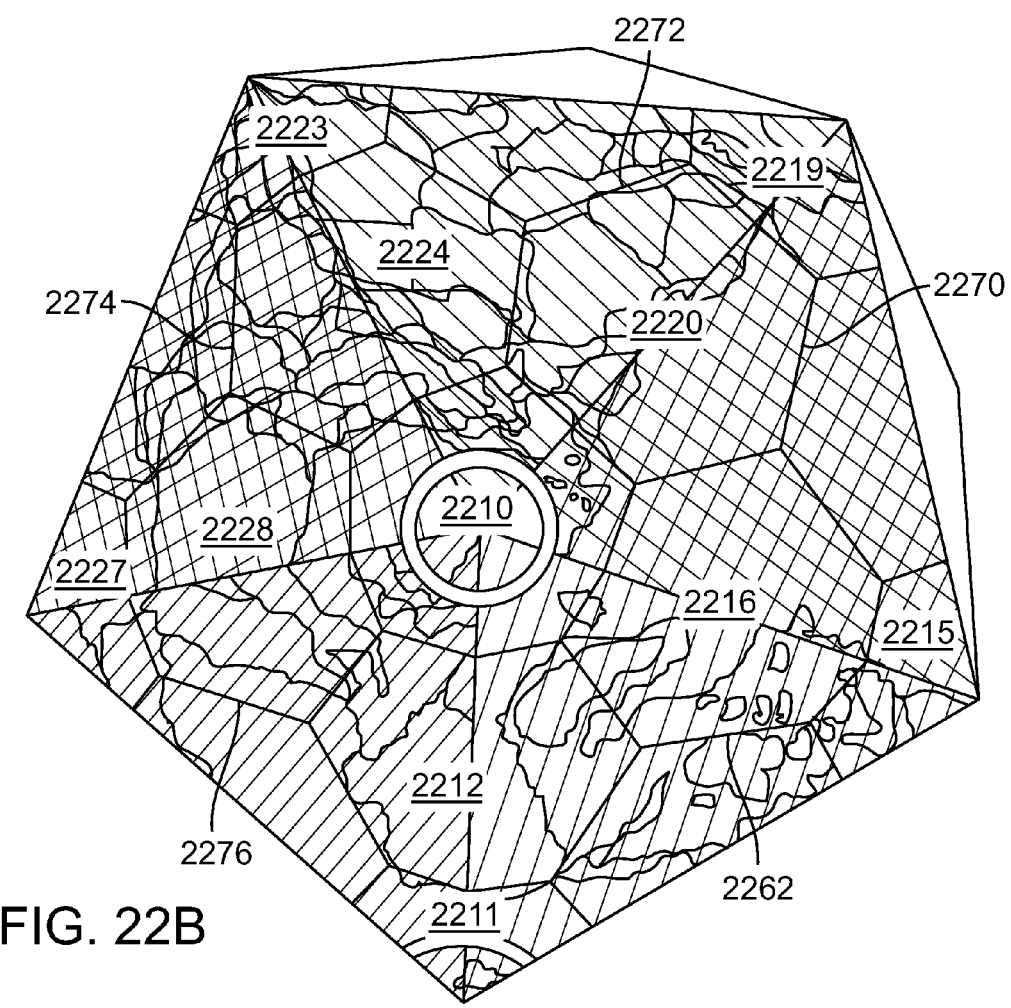

CPI systems can be used to index three-dimensional surfaces, such as spheroids and ellipsoids, as well as planar surfaces. The A7 hexagonal aggregation system known as Generalized Balanced Ternary (GBT) is a widely used hierarchical indexing system for planar hexagonal grids because GBT maintains the full symmetry of the hexagon across all indexing resolutions. GBT can also be extended to a spherical topology to create a discrete global grid system (DGGS). This can be accomplished by centering $C^6$ generator base cells (with appropriate sub-sequences chosen for non-generation) on each of the valence 5 vertices of an icosahedron, and then using an icosahedral projection to project the resulting grid onto a sphere or ellipsoid to create a DGGS. This is illustrated in FIGS. 23E-23F FIGS. 22A-22F show an exemplary CPI system for indexing the surface of the Earth. FIG. 22A shows a triangle-based projection of the Earth's surface overlaid with 42 resolution 1 hexagonal cells. Each of the triangles is a triangular face of an icosahedron, as shown in FIG. 22B, representing the Earth. The icosahedron is then projected to the surface of an ellipsoid using the inverse icosahedral projection of R. Buckminster Fuller.

This grid system is designed to achieve a finest resolution having an intercell spacing of approximately 500 meters, which cannot be achieved with sufficient accuracy using a pure aperture grid system. Additionally, to take advantage of pre-existing discrete global grid software tools, the cells are hierarchically indexed in such a manner that the indexing descendants of a single base cell are restricted to a single ij coordinate system whose axes form two of the edges of a spherical quadrilateral formed by a pair of adjacent triangular icosahedral faces.

Figure 22C:
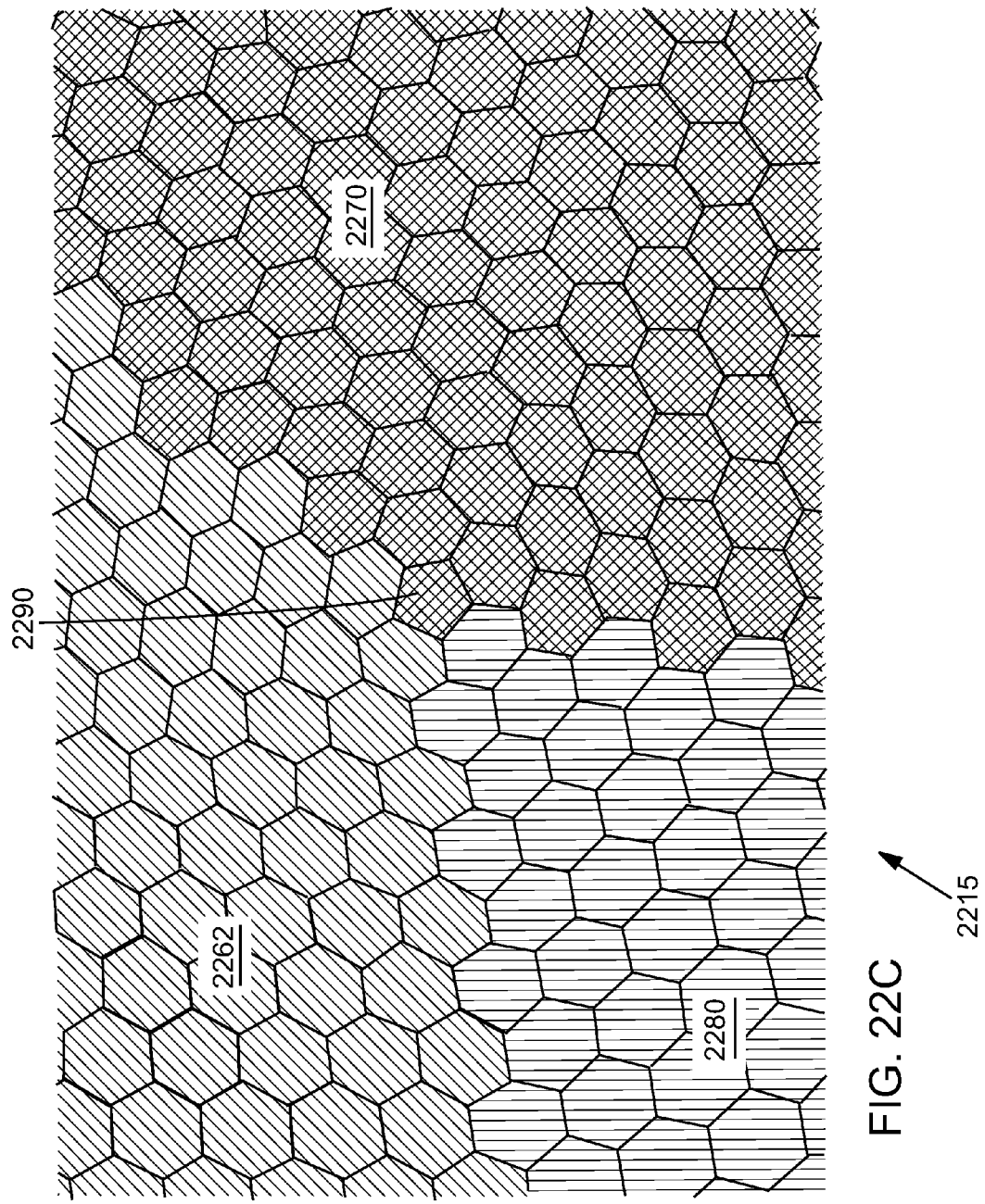
Figure 22D:
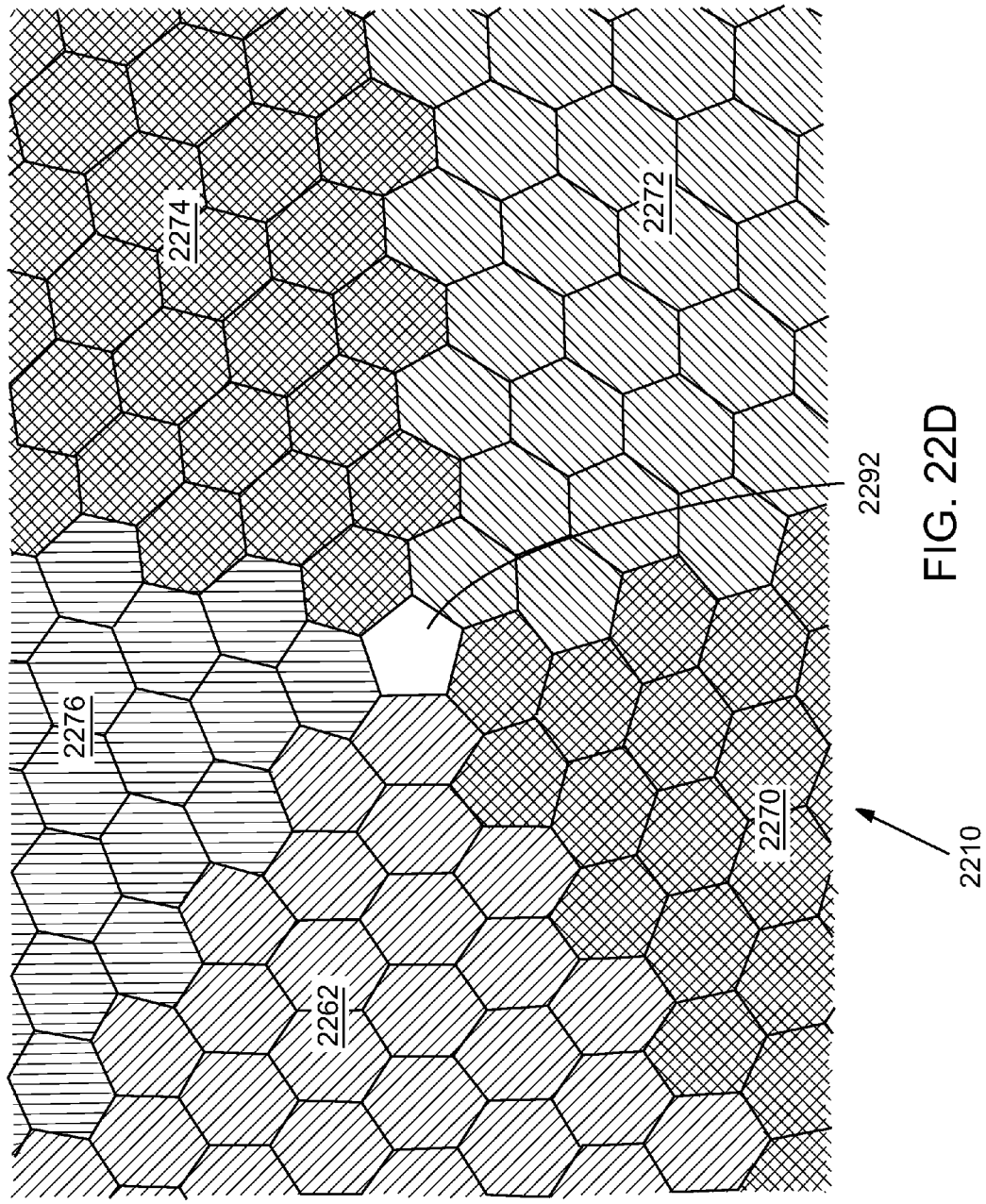
Figure 22E:
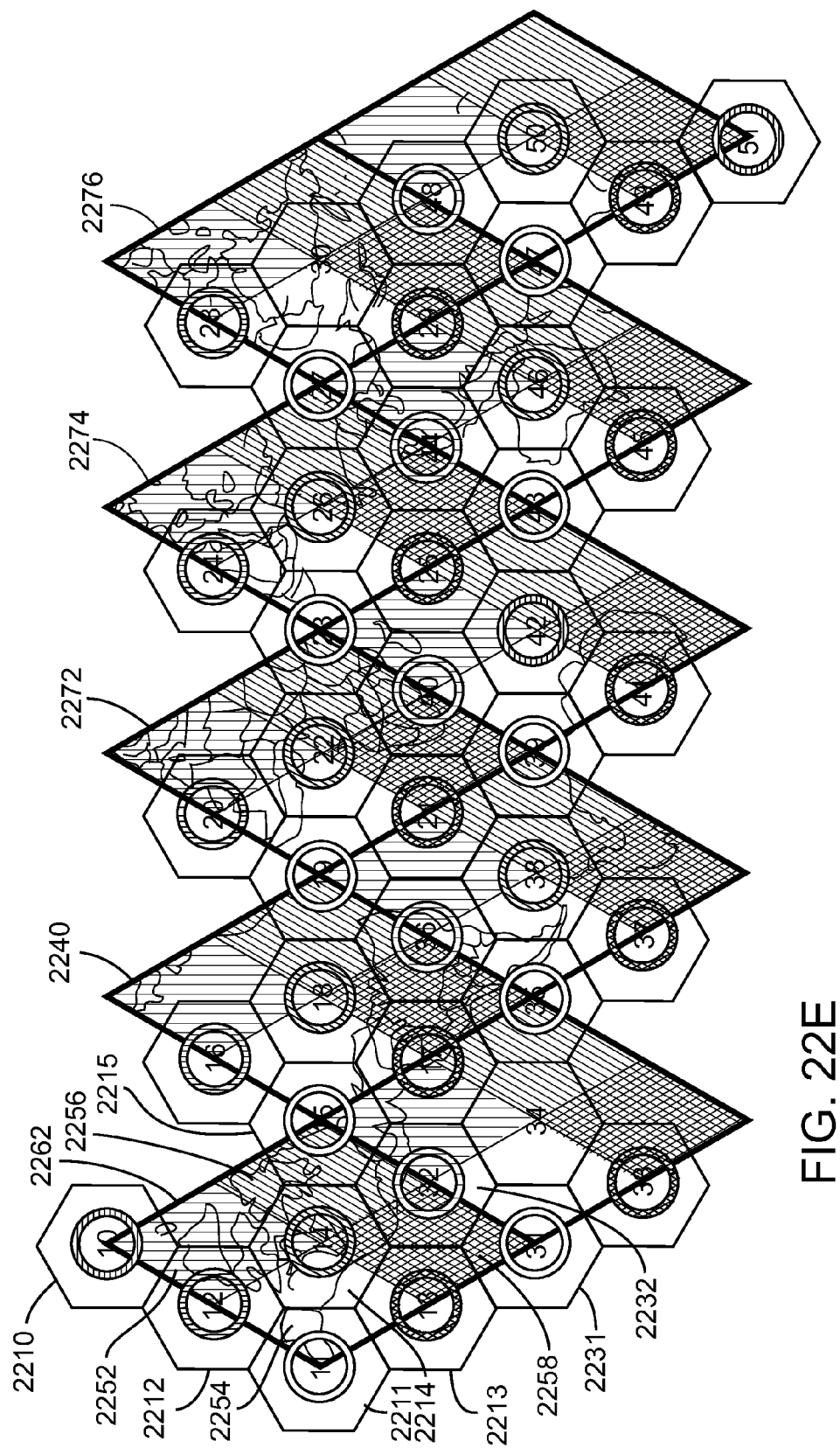
Figure 22F:
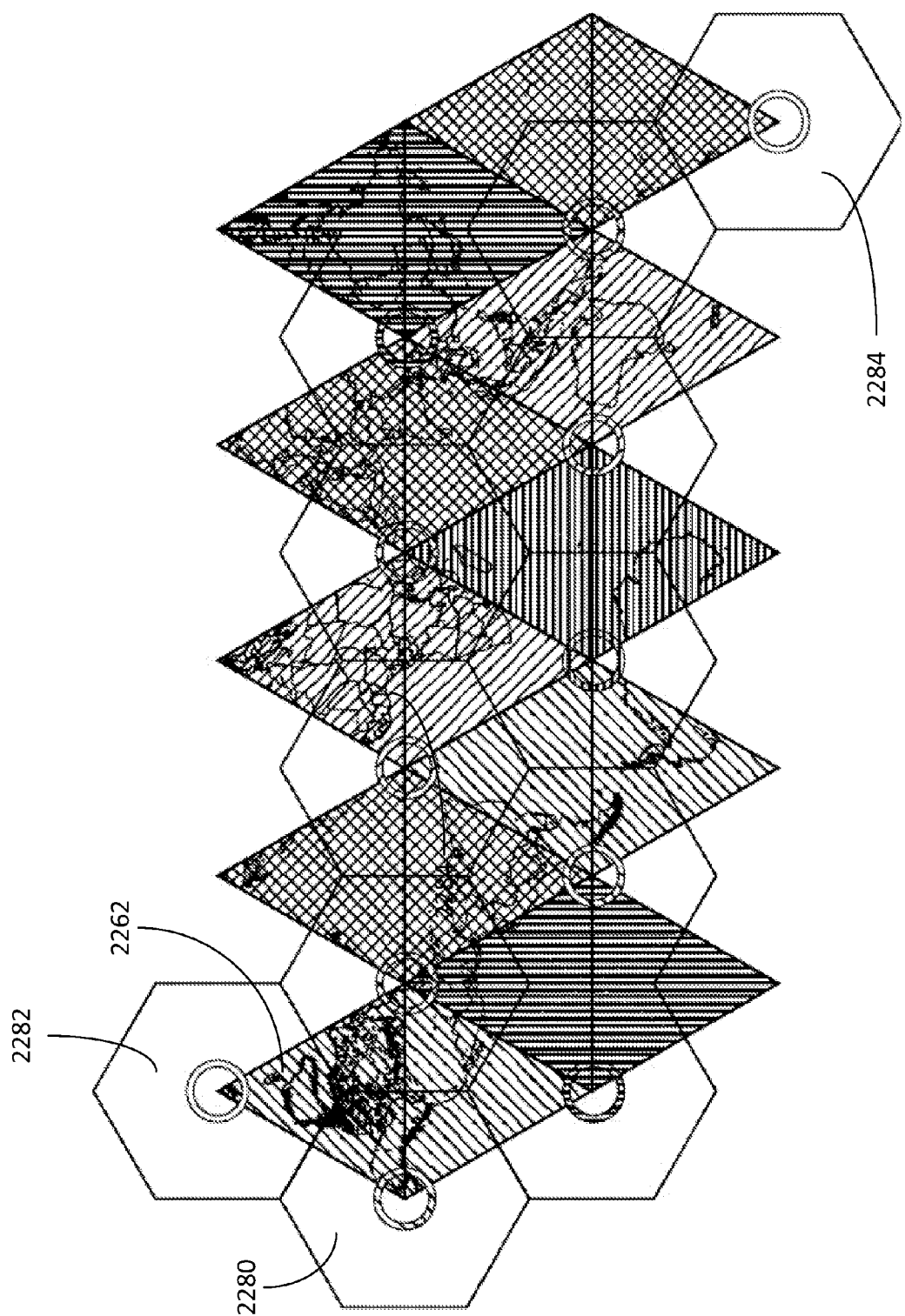

As shown in FIG. 22F, each resolution 0 base cell overlaying a vertex of the triangular manifold, such as hexagon 2280, is associated with the two-triangle quadrilateral to the right of it. In the case of hexagon 2280, it is associated with quadrilateral 2262 to the right of hexagon 2280. Each quadrilateral can be made up of two triangles. For example, quadrilateral 2262 is made up of triangles 2260 and 2264 (see FIG. 22A). The associated quadrilateral is called the footprint region of the resolution 0 base cells shown in FIG. 22F. Each cell within the footprint region of the associated base cell will have that base cell's index as the first two digits of that cell's index. Base cells 2282 and 2284 index only a single cell at all resolutions, centered on the corresponding base cell. Note that all cells that are centered on a triangle vertex are actually pentagons on the sphere.

When FIG. 22A is folded up to form the icosahedron of FIG. 22B, each of the quadrilaterals 2262, 2270, 2272, 2274 and 2276 meet together to form an vertex of the icosahedron covered by resolution 1 hexagon 2210. Resolution 1 hexagon 2216 becomes a neighbor of hexagons 2214, 2212, 2210, 2220, 2218 and 2215.

This grid system is constructed by centering base cells of valence 5 (i.e., with pentagonal voronoi areas) on each of the 12 vertices of an icosahedron and then applying the following aperture sequence:
4 4 3$^{ccw}$, 3$^{cw}$, 3$^{ccw}$, 3$^{cw}$, 3$^{ccw}$, 3$^{cw}$, 3$^{ccw}$, 3$^{cw}$, 3$^{ccw}$, 3$^{cw}$, 3$^{ccw}$, 3$^{cw}$, 3$^{ccw}$, 3$^{cw}$, 3$^{ccw}$.

To assign a unique hierarchical index to each cell, the generator types A-K are defined with the following generator string representations:
A: A123456
B: C123CCC
C: D123EED
D: F123IK6
E: J123GH6
F: D123EE6
G: DD234E6
H: EE2D456
I: E1DD456
J: E1D345E
K: D123E5D Two of the base cells on opposing sides of the icosahedron are assigned generator type A, while the remaining 10 base cells (centered on the remaining 10 icosahedral vertices) are assigned generator type B. The resolution 0 base cells 2282 and 2284, which are concentric with the resolution 1 cells 2210 and 2251, are the two base cells that are assigned generator type A, which generates a single pentagonal cell at all resolutions.

FIG. 22C shows a close-up of resolution 17 cells in the area of cell 2215. The center cell 2290 is a pentagon and is centered on an icosahedral vertex. To the upper-left are cells associated with quadrilateral 2262 (and base cell 2280), to the lower-left are cells associated with quadrilateral 2280 and to the right are cells associated with quadrilateral 2270.

FIG. 22D shows a close-up of resolution 17 cells in the area of base cell 2282 and resolution 1 cell 2210. To the upper left are cells associated with quadrilateral 2276, to the left are cells associated with quadrilateral 2262 (and base cell 2280), to the lower-left are cells associated with quadrilateral 2270, to the lower-right are cells associated with quadrilateral 2272, and to the upper-right are cells associated with quadrilateral 2274. Only the center pentagon 2292 is associated with resolution 1 cell 2210.

FIG. 22E shows a variation of FIG. 22A wherein each quadrilateral associated with a base cell is divided into four even quadrilaterals each associated with a resolution 1 cell. For example, quadrilateral 2262 is divided into quadrilaterals 2252, 2254, 2256 and 2258. Each of the resolution 1 cells is then associated with the area of the smaller quadrilateral to the right of it such that finer-resolution cells in that quadrilateral will be associated with that base cell. For example, cell 2212 is associated with the finer resolution cells in the area of quadrilateral 2252, etc.

Applications

The following is a brief summary of some exemplary applications of CPI systems:

1. If a planar grid is generated, the grid cells and/or their associated center points can be used to represent points, areal pixels, database buckets, or graph nodes in any planar application.

2. If a polyhedral grid is generated, any transformation (such as a polyhedral map projection) can be used to map the resulting grids onto the surface of a sphere, ellipsoid, or other topological equivalent, such as represents a celestial body, for example. The grid cells and/or their associated center points can be used to represent points, areal pixels, database buckets, or graph nodes on the sphere or topological equivalent. These can be used in any application where data is associated with locations on a topological sphere, or which involves calculating algorithms associated with location on a topological sphere. These include geospatial computing systems (including geographical information systems), location-based computing, and in developing solutions for (or in providing initial conditions for optimization solutions to) Tammes' problem for efficient spherical coding.

3. If a polyhedral grid is generated, any transformation (such as a polyhedral map projection) can be used to map each resulting grid resolution k to the surface of a sphere $S_k$ with radius $r_k$, where $r_k$ is $<r_{k+1}$, and with all of the spheres S sharing a common center point. The grid cells, their associated center points, or the 3-dimensional voronoi cells associated with those center points, can be used to represent points, voxels, database buckets, or graph nodes in 3-dimensional space in any application.

FIGS. 23A-23E illustrate a user input/output display associated with a computer application that can generate, index and store CPI systems based on user-input specifications.

Figure 23A:
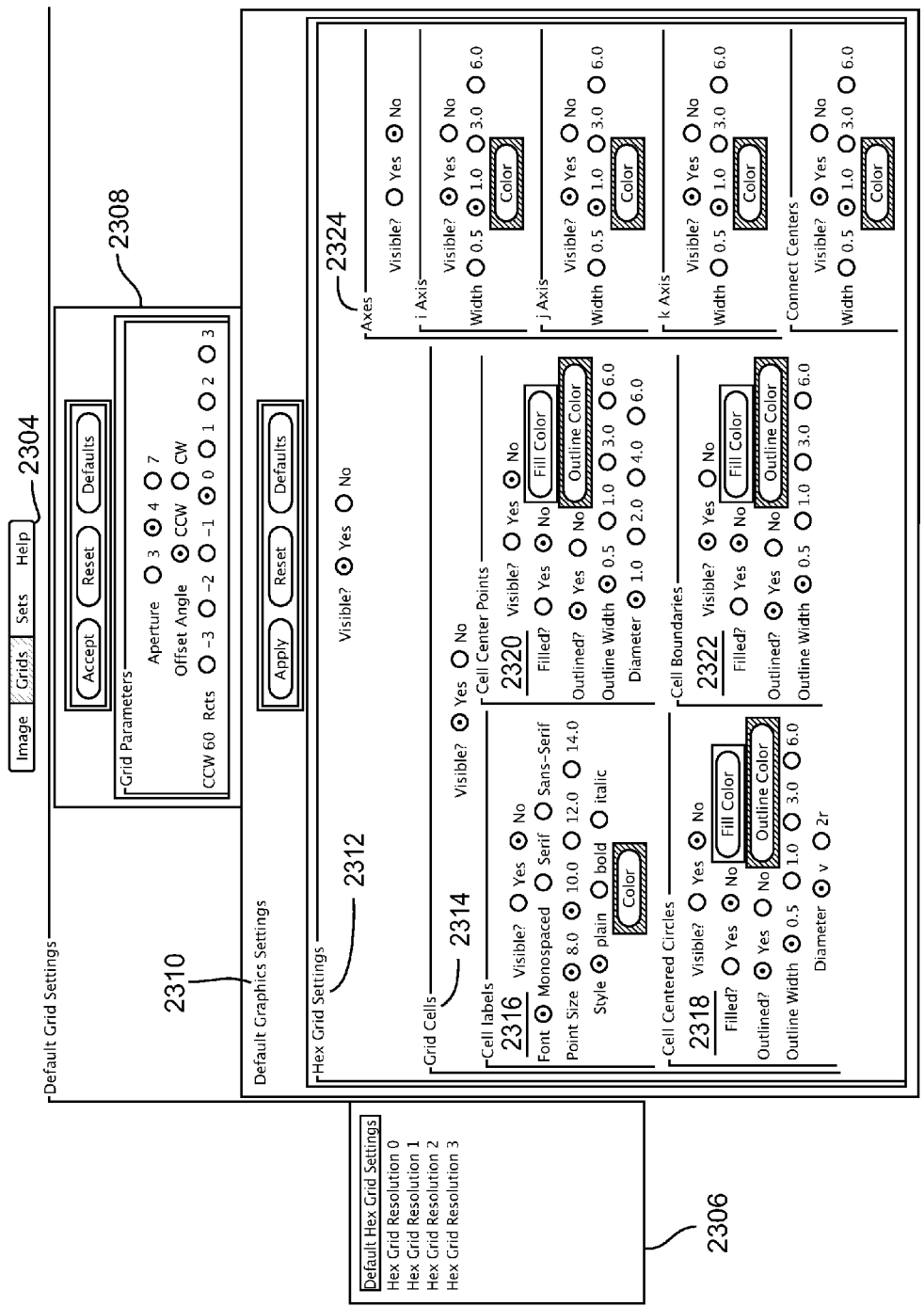
FIG. 23A-23F show exemplary applications of CPI systems.

FIG. 23A shows a screen shot 2302 associated with an exemplary indexing application 2302. Field 2304 allows a user to select different portions of the application, including grid settings portions, as shown. Field 2308 allows the user to select grid parameters, such as aperture and rotation. Field 2306 allows the user to select either default settings, as shown, or one of the different resolutions of the grid. Field 2310 include several default settings for hex grids 2312, including cell labels 2316, cell centered circles 2318, cell center points 2320, cell boundaries 2322 and axes 2324.

Figure 23B:
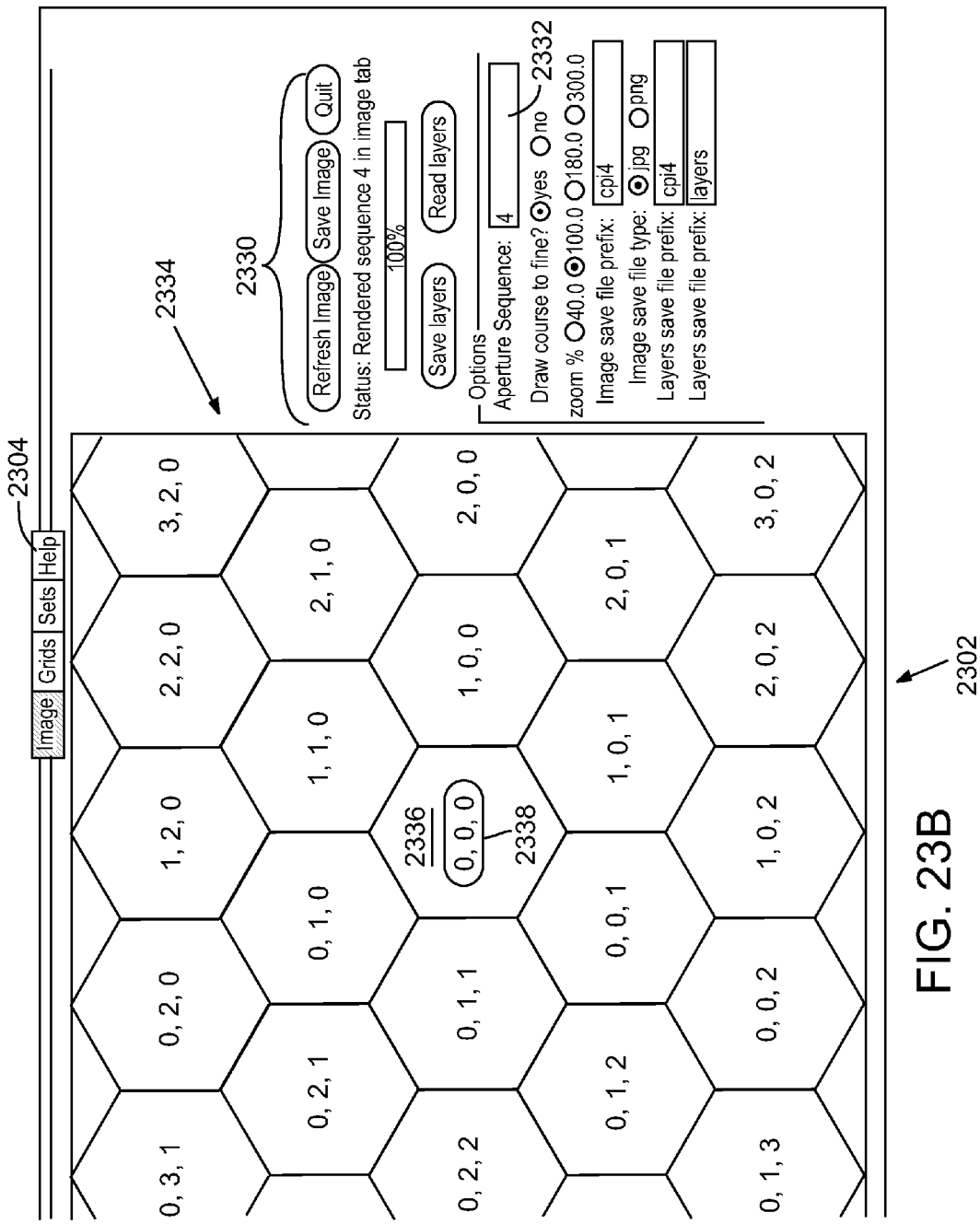

FIG. 23B shows an example of the image portion of the screen shot 2302 of FIG. 23A. In a field 2330, the user can select an aperture sequence and other grid parameters at entry box 2332. The user can refresh or save the resulting grid image 2334 by selecting a suitable action at 2330. Different options are provided for saving or storing the resulting grid indexes on a computer readable storage medium. Given the inputs shown, the application generates an image of a single resolution hex grid with ijk+ indexes 2338. The center hexagon 2336 is given the index of (0,0,0).

Figure 23C:
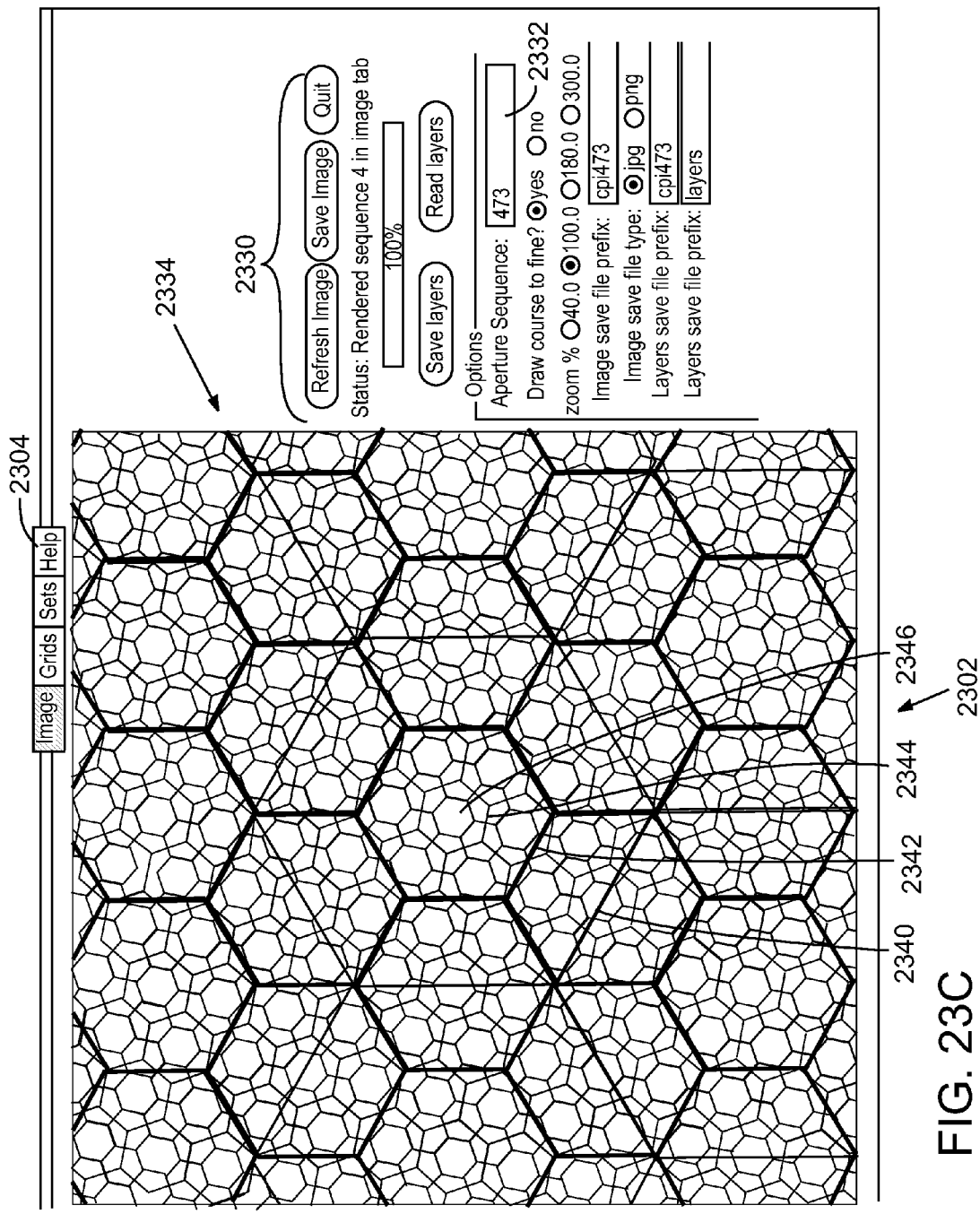

FIG. 23C shows another example of an image portion associated with the screen shot 2302. In the field 2332, a mixed-aperture sequence of "473" is selected. This results in a grid image 2334 having a coarsest layer 2340, an A4 layer 2342 (in bold), an A7 layer 2344 and a finest A3 layer 2346.

Figure 23D:
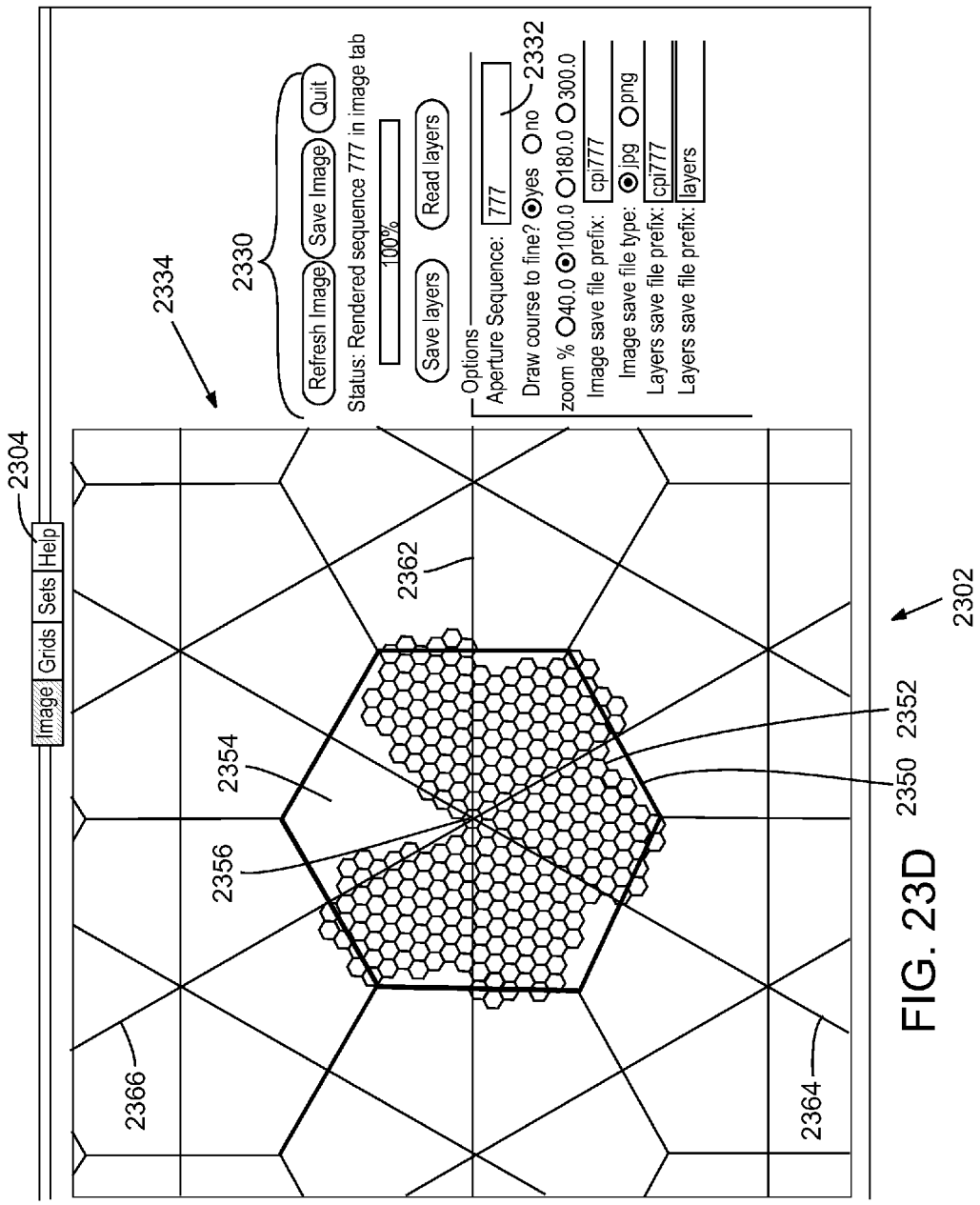

FIG. 23D shows another example of the image portion of the screen shot 2302. In the field 2332, a pure-aperture sequence of "777" is selected. Other settings are selected such that the ijk axes 2362, 2364 and 2366 and the origin 2356 are shown, and the intermediate grid layers are not shown. The resulting image 2334 shows a base layer including hexagon 2350 and its A343 children 2352. However, as this application is used in reference to tiling an icosahedron, and because base cell 2350 is centered on a vertex 2356 of the icosahedron, the application only generated ⅚ of the A343 cells. Thus, base cell 2350 is similar to base cell 2215 in FIG. 22A.

Figure 23E:
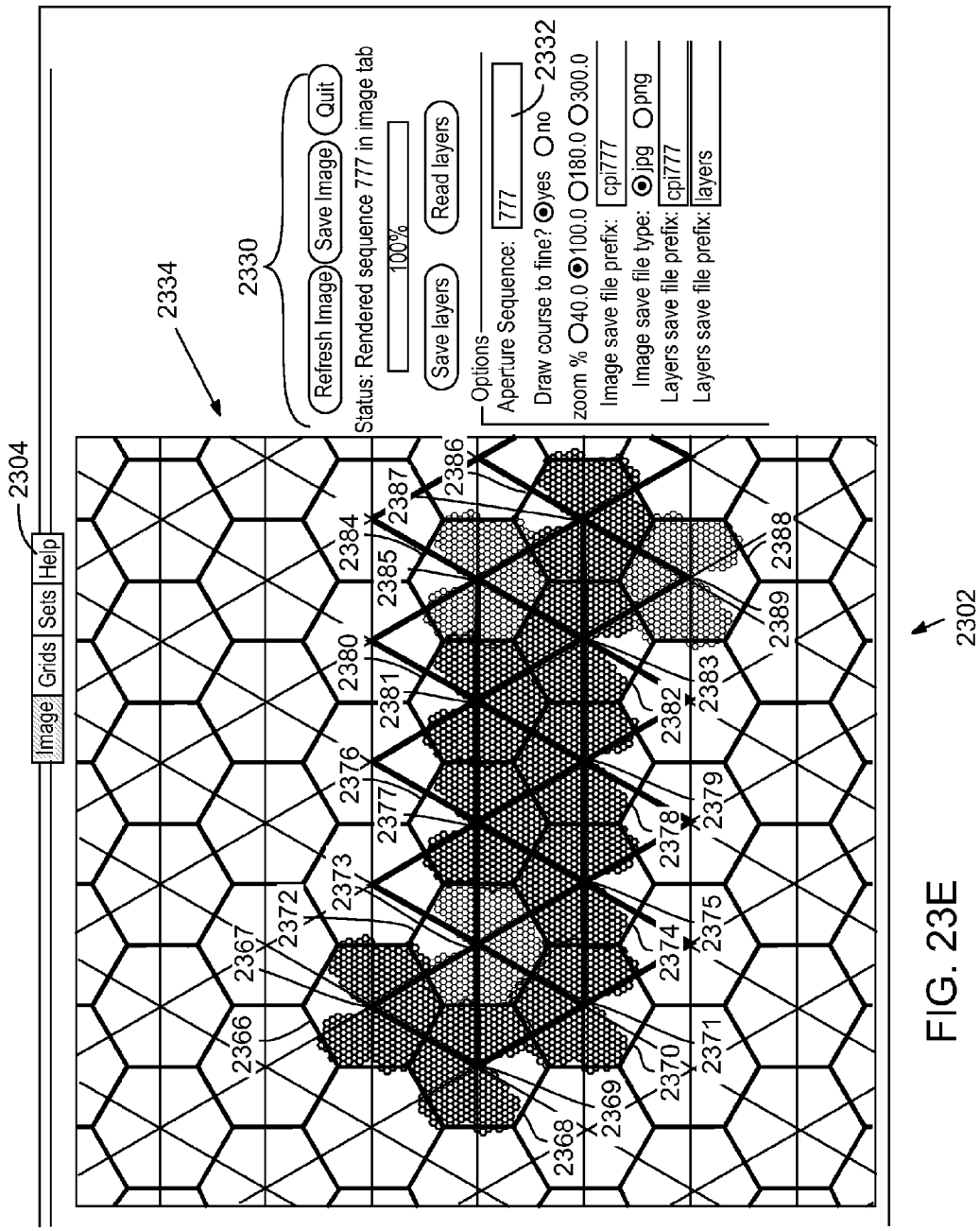

FIG. 23E shows a screen display that includes 12 hexagons similar to the hexagon 2350, and their A343 children tiled across a triangular lattice. Each of the base cells 2366-2388 is centered on a respective vertex 2367-2389 (odd numbers) of the lattice.

Figure 23F:
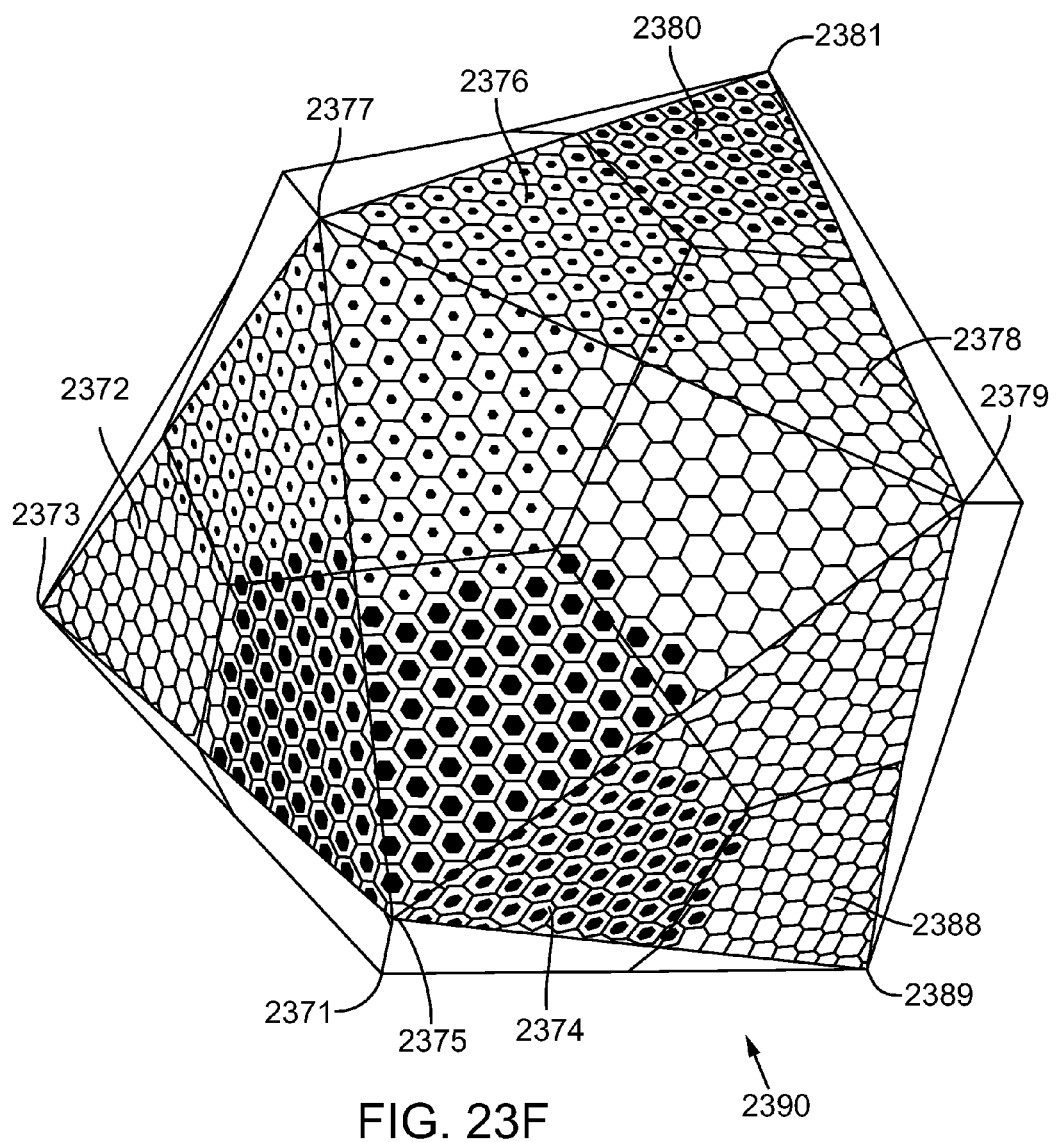

Finally, as shown in FIG. 23F, the application maps the CPI system shown in FIG. 23E onto an icosahedron, such that each vertex of the lattice corresponds to a vertex of the icosahedron. The application can then map CPI indexes for each of the hexagon cells to locations on the icosahedron and store the relationships therebetween. If the icosahedron represents the Earth, then the application can map locations on Earth's surface (i.e., a city or a patch of land) to one or more of the cells of the CPI system. Metric distances and other useful relationships between different portions of the Earth can also be calculated using the CPI system.

In one type of useful CPI application, a finest resolution of cells and a coarsest resolution of cells can be defined first, and then a combination of intermediate resolutions can then be calculated and/or generated based on the finest and coarsest layers. For example, if it is desirable that the finest resolution of cells corresponds to 1000 m² patches of the Earth's surface and the coarsest resolution of cells corresponds to 1/12 of the Earth's surface (such as when representing the Earth's surface with 12 base cells on an icosahedron, as in FIG. 23F), the intermediate resolution of cells can be calculated as a combination of A3, A4, and A7 resolutions that lead from the 12 base cells to a resolution wherein each cell has an area nearest to 1000 m².

Figure 18:
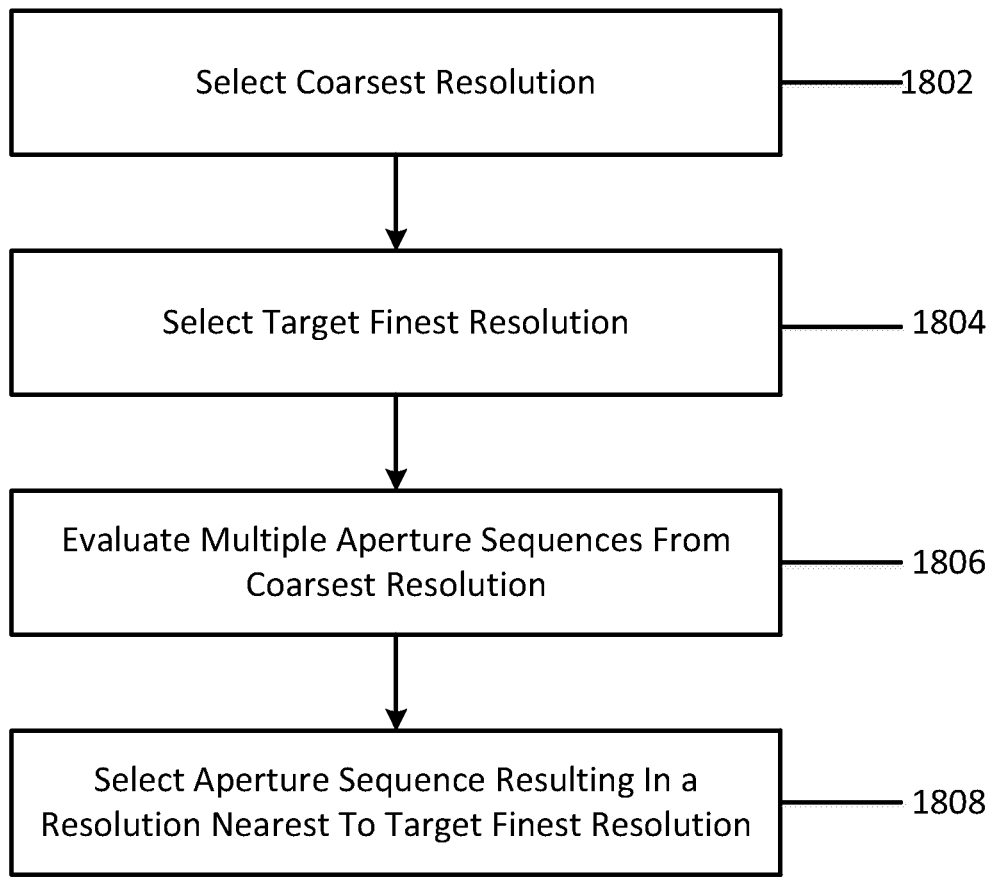
FIG. 18 is a block diagram illustrating an exemplary method for defining a multi-resolution CPI system.

FIG. 18 is a block diagram illustrating an exemplary method for defining a CPI system, wherein a coarsest resolution and a target finest resolution are selected at 1802 and 1804, respectively, and an aperture sequence is selected at 1808 that generates a resolution nearest to the target resolution. In some examples, the coarsest resolution can be associated with a set of base cells corresponding to an icosahedron that represents the surface of the Earth. Thus, the selection of the coarsest resolution at 1802 can be determined by the size of the Earth. The target finest resolution can be selected to correspond to particular dimensions at the surface of the Earth, such as linear distances of 100 m, 500 m, 1000 m, or other distances. Multiple aperture sequences from the coarsest resolution can be evaluated at 1806. Starting with the selected coarsest resolution, a plurality of different combinations of intermediate resolutions that can be generated from the coarsest resolution using a mixture of apertures A3, A4 and/or A7 can be evaluated to determine which aperture sequence results in a preferred approximation of the target finest resolution. The aperture sequence that results in a resolution nearest to the target finest resolution can be selected at 1808. In one example, from the selected aperture sequence, a multi-resolution grid can be created and used to index portions of the Earth's surface at a resolution corresponding to the target finest resolution.

In any application an object or a location is associated with one or more cells of a CPI grid, it should be understood that the object or location need not be within or overlap the cell or cells associated with it. In some examples, an object or location is associated with a CPI grid cell that removed that object or location. In some CPI systems similar to that shown in FIGS. 22A-F, for example, locations on the Earth's surface can be associated with CPI grid cells that are positioned generally to the left (or to the west) of the location. In addition, even in situations where an object or location is within a finest resolution cell associated with the object or location, the object or location may not be within other lower resolution cells associated with the object or location. Using FIG. 1 as an example, an object could be located within cell 116, but not be located within its parent cell 102, yet the object can be associated with both cell 102 and 116.

Typical CPI System Advantages

The following is a brief summary of some exemplary advantages of CPI systems. Such systems can provide a uniform approach to hierarchically generating, indexing, and manipulating pure and mixed aperture hexagon grids, including efficient algorithms for index addition, subtraction, neighbor-finding, and metric distance. For single resolution applications, mixed apertures can permit fine control over grid resolution. For example, in DGGS applications, mixing apertures can give users more grid resolutions to choose from, increasing the chances that a resolution exists that approximates the ideal grid resolution for a particular application in terms of grid cell size, grid point spacing, number of cells, etc. Mixed apertures can allow for mixed resolution frequency. That is, the spacing between resolutions need not be uniform. Applications involving multiple components operating at different discrete spatial resolutions can each choose appropriate grid resolutions, as mentioned above, while still all participating in a hierarchical location coding. The resolution frequency can be increased (by decreasing the aperture) in resolution ranges of interest to the application. The frequency can be decreased (by increasing the aperture) in regions that are of less interest to the application. Not only can an individual application tailor resolutions as preferred, but given any two such resolution frequency specifications, a higher resolution grid that participates in both hierarchies can be generated, providing a common spatial substrate to multiple independent applications. Fast integer distance computations on hexagon grids facilitate efficient proximity searches. In CPI, hierarchical containment can be expressed as metric distance, allowing efficient coarse filtering for intersection and spatial queries.

Integer algorithms can be implemented very efficiently on mobile devices (e.g. smart phones), which often do not have Floating Point Units (FPUs). A uniform approach to manipulating mixed-aperture CPI hierarchies has value for research into economic CPI structures and in the development of CP-related algorithms (e.g., placement of retail outlets, cell phone towers, etc.).

Computing Environment

Figure 24:
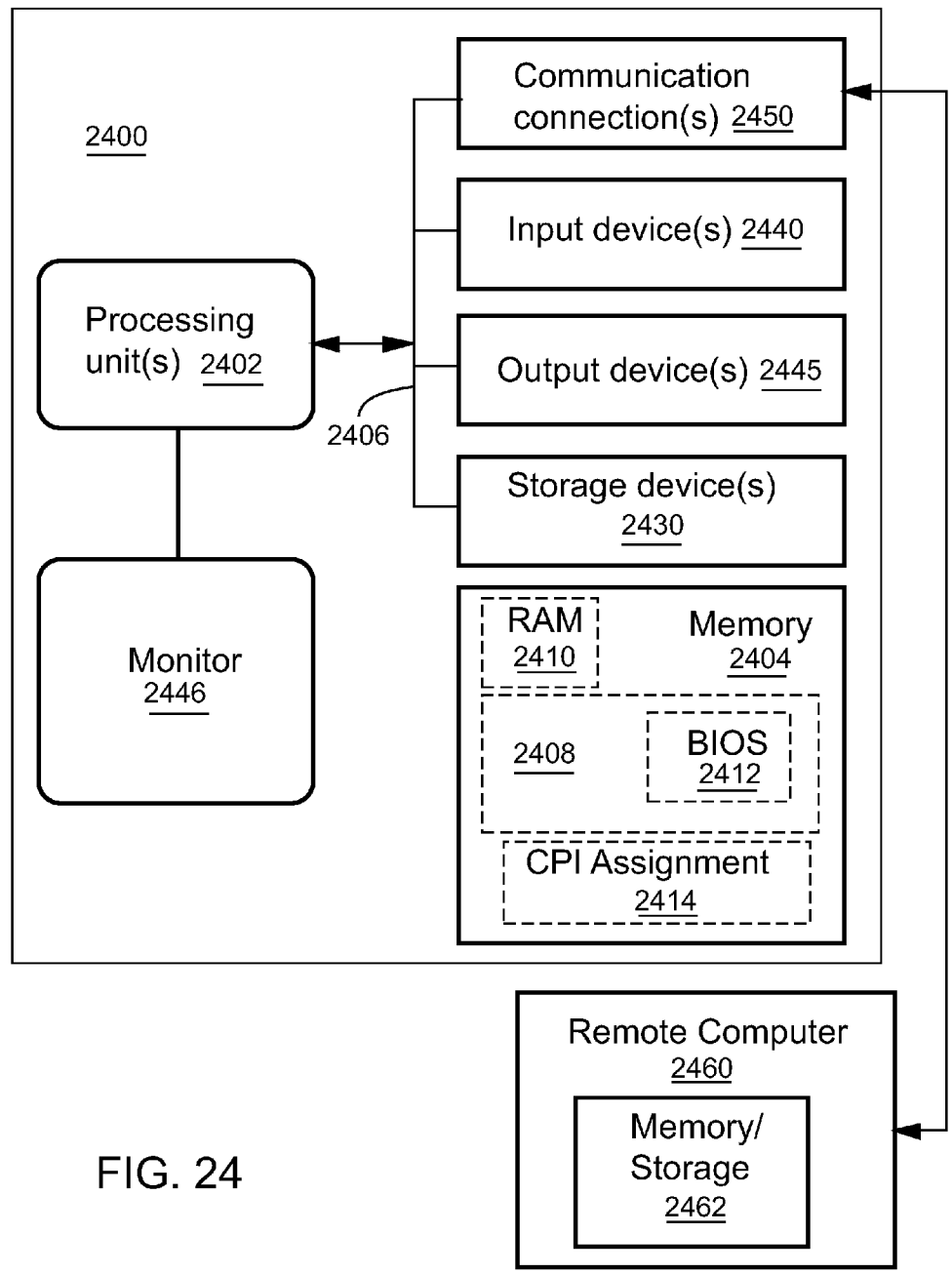
FIG. 24 shows an exemplary computing environment.

FIG. 24 and the following discussion are intended to provide a brief, general description of an exemplary computing environment in which the disclosed technology may be implemented. Although not required, the disclosed technology is described in the general context of computer-executable instructions, such as program modules, being executed by a personal computer (PC). Generally, program modules include routines, programs, objects, components, data structures, etc., that perform particular tasks or implement particular abstract data types. Moreover, the disclosed technology may be implemented with other computer system configurations, including hand-held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 24, an exemplary system for implementing the disclosed technology includes a general purpose computing device in the form of an exemplary conventional PC 2400, including a processing unit 2402, a system memory 2404, and a system bus 2406 that couples various system components including the system memory 2404 to the processing unit 2402. The system bus 2406 may be any of several types of bus structures including a memory bus or memory controller, a peripheral bus, and a local bus using any of a variety of bus architectures. The exemplary system memory 2404 includes read only memory (ROM) 2408 and random access memory (RAM) 2410. The memory 2404 can also include a CPI Assignment memory 2414 for storing indexes and other information relating to CPI systems and application relating to CPI systems. A basic input/output system (BIOS) 2412, containing the basic routines that help with the transfer of information between elements within the PC 2400, is stored in ROM 2408.

The exemplary PC 2400 further includes a hard disk drive 2415 for reading from and writing to a hard disk (not shown), a magnetic disk drive 2416 for reading from or writing to a removable magnetic disk 2417, and an optical disk drive 2418 for reading from or writing to a removable optical disk 2419 (such as a CD-ROM or other optical media). The hard disk drive 2415, magnetic disk drive 2416, and optical disk drive 2418 are connected to the system bus 2406 by a hard disk drive interface 2420, a magnetic disk drive interface 2422, and an optical drive interface 2424, respectively. The drives and their associated computer-readable media provide non-volatile storage of computer-readable instructions, data structures, program modules, and other data for the PC 2400. Other types of computer-readable media which can store data that is accessible by a PC, such as magnetic cassettes, flash memory cards, digital video disks, CDs, DVDs, RAMs, ROMs, and the like, may also be used in the exemplary operating environment.

A number of program modules may be stored on the hard disk 2415, magnetic disk 2417, optical disk 2419, ROM 2408, or RAM 2410, including an operating system 2430, one or more application programs 2432, other program modules 2434, and program data 2436. A user may enter commands and information into the PC 2400 through input devices such as a keyboard 2440 and pointing device 2442 (such as a mouse). Typically, commands and instructions are provided for multi-resolution indexing and grid generation and are stored as computer executable instructions. Other input devices (not shown) may include a digital camera, microphone, joystick, game pad, satellite dish, scanner, or the like. These and other input devices are often connected to the processing unit 2402 through a serial port interface 2444 that is coupled to the system bus 2406, but may be connected by other interfaces such as a parallel port, game port, or universal serial bus (USB). A monitor 2446 or other type of display device is also connected to the system bus 2406 via an interface, such as a video adapter 2448. Other peripheral output devices, such as speakers and printers (not shown), may be included.

The PC 2400 may operate in a networked environment using logical connections to one or more remote computers, such as a remote computer 2450. The remote computer 2450 may be another PC, a server, a router, a network PC, or a peer device or other common network node, and typically includes many or all of the elements described above relative to the PC 2400, although only a memory storage device 2452 has been illustrated in FIG. 24. The logical connections depicted in FIG. 24 include a local area network (LAN) 2454 and a wide area network (WAN) 2456. Such networking environments are commonplace in offices, enterprise-wide computer networks, intranets, and the Internet.

When used in a LAN networking environment, the PC 2400 is connected to the LAN 2454 through a network interface 2458. When used in a WAN networking environment, the PC 2400 typically includes a modem 2460 or other means for establishing communications over the WAN 2456, such as the Internet. The modem 2460, which may be internal or external, is connected to the system bus 2406 via the serial port interface 2444. In a networked environment, program modules depicted relative to the personal computer 2400, or portions thereof, may be stored in the remote memory storage device. The network connections shown are exemplary, and other means of establishing a communications link between the computers may be used.

Other computing devices such as lap top computers, cellular phones, personal digital assistants, GPS positioning units, and other portable or fixed devices can be used.

Having described and illustrated the principles of my invention with reference to the illustrated embodiments, it will be recognized that the illustrated embodiments can be modified in arrangement and detail without departing from such principles. For instance, elements of the illustrated embodiment shown in software may be implemented in hardware and vice-versa. Also, the technologies from any example can be combined with the technologies described in any one or more of the other examples. In view of the many possible embodiments to which the principles of the invention may be applied, it should be recognized that the illustrated embodiments are examples of the invention and should not be taken as a limitation on the scope of the invention. For instance, various components of systems and tools described herein may be combined in function and use. Alternatives specifically addressed in these sections are merely exemplary and do not constitute all possible alternatives to the embodiments described herein.

I claim:

1. A method of specifying a mixed-aperture polygon grid, the method comprising:
   specifying a first polygon in a first layer, the first polygon having a first center point;
   specifying, with a processor, a second polygon in a second layer, the second polygon having the first center point, the second polygon being a child of the first polygon and having a first scaling factor relative to the first polygon; and specifying, with a processor, a third polygon in a third layer, the third polygon having the first center point, the third polygon being a child of the second polygon and having a second scaling factor relative to the second polygon;

wherein the first and second scaling factors are different.

2. The method of claim 1, wherein the second polygon is a first aperture child of the first polygon, the third polygon is a second aperture child of the second polygon, the first and second apertures are selected from a group consisting of aperture 3, aperture 4, and aperture 7, and the first aperture is different than the second aperture.

3. The method of claim 1, further comprising:
assigning a location identifier associated with an object that is associated with area defined by the third polygon, the location identifier being based on the first, second and third polygons and the first and second scaling factors.

4. The method of claim 1, further comprising:
storing a location identifier associated with the third polygon in integer code form, modified integer code form, or packed code form.

5. The method of claim 1, wherein the first, second and third polygons are centered on a vertex of a triangulated two-dimensional manifold and the first polygon corresponds to a voronoi area of the vertex.

6. The method of claim 5, wherein the manifold is a triangle faced regular polyhedron.

7. The method of claim 5, wherein the manifold is an arbitrary two-dimensional triangulated manifold with unequal edges.

8. At least one computer readable storage device, comprising computer-executable instructions for the method of claim 5.

9. The method of claim 5, wherein the triangulated two-dimensional manifold corresponds to a curved two-dimensional surface.

10. The method of claim 1, wherein the first, second and third polygons are hexagons and at least one of the second and third polygons is rotated 30° or about 19° relative to its parent.

11. The method of claim 10, further comprising:
identifying a first set of hexagons adjacent to the second polygon, the first set of hexagons being children of the first polygon and having the first scaling factor relative to the first polygon; and
identifying a second set of hexagons adjacent to the third polygon, the second set of hexagons being children of the second polygon and having the second scaling factor relative to the second polygon.

12. The method of claim 1, wherein the third polygon comprises the same size, rotation and position relative to the first polygon if the first and second scaling factors are reversed.

13. The method of claim 1, wherein the first, second and third polygons have less than 6 edges.

14. A method comprising:
specifying a first cell size;
specifying a second cell size that is larger than the first cell size;
specifying, with a processor, one or more intermediate cell sizes each being larger than the first cell size and smaller than the second cell size, wherein each of the first cell size and the intermediate cell sizes comprises a respective size ratio relative to a next largest cell size, the next largest cell size being one of the intermediate cell sizes or the second cell size, the size ratios not being all the same; and assigning, with a processor, a cell grid to an area, wherein the cell grid includes at least one cell of the first cell size in a first layer, at least one of the intermediate cell sizes in a second layer, and at least one of the second cell size in a third layer.

15. The method of claim 14, wherein the first cell size is a first cell edge length, the second cell size is a second cell edge length, the intermediate cell sizes are intermediate cell edge lengths, and the size ratios are chosen from a group comprising $1:\sqrt{3}$, $1:\sqrt{4}$ and $1:\sqrt{7}$.

16. The method of claim 14, wherein the first cell size is a first cell area, the second cell size is a second cell area, the intermediate cell sizes are intermediate cell areas, and the size ratios are chosen from a group comprising 1:3, 1:4 and 1:7.

17. The method of claim 14, wherein the first, second and intermediate cell sizes correspond to hexagonal areas.

18. The method of claim 14, wherein the first cell size corresponds to a desired minimum resolution of a multi-resolution central place indexing system and the second cell size corresponds to a maximum resolution of the multi-resolution central place indexing system.

19. An apparatus, comprising:
at least one computer readable medium; and
a processor configured to establish an object location with reference to a multi-aperture grid based on computer-executable instructions stored in the at least one computer readable medium, wherein the multi-aperture grid includes at least a first aperture and a second aperture, the first and second apertures are selected from a group consisting of aperture 3, aperture 4, and aperture 7, and the first aperture is different than the second aperture.

20. The apparatus of claim 19, wherein the processor is further configured to assign a unique location code to the object.

21. The apparatus of claim 19, wherein the processor is further configured to establish at least a portion of the multi-aperture grid by generating non-overlapping cells, and to provide a unique location code based on at least one non-overlapping cell.

22. The apparatus of claim 21, wherein the processor is configured to establish at least a portion of the multi-resolution grid based on aperture 3 child cells, and to associate child cells with aperture 3 base cells so as to provide a unique location code for the object location.

23. The apparatus of claim 21, wherein the processor is configured to establish at least a portion of the multi-resolution grid based on aperture 4 child cells, and to associate the child cells with aperture 4 base cells so as to provide a unique location code for the object location.

24. The apparatus of claim 22 or claim 23, wherein the child cells of a first base cell are arranged in a first child block pattern and the child cells of a second base cell are arranged in a second child block pattern different than the first child block pattern.

25. The apparatus of claim 22 or claim 23, wherein the processor is configured to further establish a second portion of the multi-resolution grid based on grandchild cells of the base cells, the grandchild cells being of the same aperture as the child cells, the child cells being arranged in a first child block pattern and the grandchild cells being arranged in a second child block pattern different than the first child block pattern.

26. The apparatus of claim 19, wherein the processor is configured to establish the multi-resolution grid with respect to a spherical surface.

27. A method comprising:
identifying a first coordinate system for an area, the first coordinate system comprising three coordinate axes spaced 120° from one another;
identifying a second coordinate system for the area, the second coordinate system comprising a hexagon-based, multi-resolution, mixed-aperture central place indexing system; and
for an object associated with the area, converting, with a processor, between a first location code for the object based on the first coordinate system and a second location code for the object based on the second coordinate system.

28. The method of claim 27, wherein the second location code comprises a first integer corresponding to a coarsest hexagon and additional concatenated digits corresponding to successively finer hexagons descended from the coarsest hexagon, the finest of the successively finer hexagons associated with the object.

29. The method of claim 28, wherein each additional digit is a single integer from 0 to 6, 0 indicating a child hexagon sharing a center with its parent.

30. The method of claim 27, wherein the mixed-aperture central place indexing system comprises two or more apertures selected from a group comprising aperture 3, aperture 4 and aperture 7.

31. A method, comprising:
specifying a sequence of aperture 7 polygonal grids, each polygonal grid having an associated polygon rotation; and
establishing, by a processor, the spatial grid on an icosahedron or a sphere based on the sequence;
wherein the sequence includes at least one polygonal grid having an aperture other than 7, wherein the spatial grid is established based on the aperture 7 polygonal grids and the at least one polygonal grid having an aperture other than 7.

32. The method of claim 31, further comprising:
assigning an index associated with an object located within an area defined by the sequence, the index based on each polygonal grid of the sequence.

* * * * *